(12) United States Patent
Sawai

(10) Patent No.: US 8,626,704 B2
(45) Date of Patent: Jan. 7, 2014

(54) MAP UPDATE DATA SUPPLY DEVICE AND METHOD

(75) Inventor: Kimiyoshi Sawai, Okazaki (JP)

(73) Assignee: Aisin Aw Co., Ltd., Aichi-ken (JP)

( * ) Notice: Subject to any disclaimer, the term of this patent is extended or adjusted under 35 U.S.C. 154(b) by 314 days.

(21) Appl. No.: 13/005,799

(22) Filed: Jan. 13, 2011

(65) Prior Publication Data

US 2011/0191285 A1 Aug. 4, 2011

(30) Foreign Application Priority Data

Jan. 29, 2010 (JP) .................................. 2010-019578

(51) Int. Cl.
*G06F 17/30* (2006.01)
(52) U.S. Cl.
USPC .................. 707/602; 707/756; 707/E17.005; 707/E17.022
(58) Field of Classification Search
None
See application file for complete search history.

(56) References Cited

U.S. PATENT DOCUMENTS

| 7,082,443 | B1 | 7/2006 | Ashby |
| 2004/0135705 | A1 | 7/2004 | Umezu et al. |
| 2009/0248758 | A1 | 10/2009 | Sawai et al. |
| 2010/0312757 | A1 | 12/2010 | Meschenmoser et al. |

FOREIGN PATENT DOCUMENTS

| EP | 1385102 A2 | 1/2004 |
| JP | 2002296042 A | 10/2002 |
| JP | 2004178248 | 6/2004 |
| JP | 2004212273 A | 7/2004 |
| JP | 2004271576 A | 9/2004 |
| JP | 2007240492 A | 9/2007 |
| JP | 2008-089852 A | 4/2008 |
| JP | 2009157227 A | 7/2009 |
| WO | 2008055729 A1 | 5/2008 |

OTHER PUBLICATIONS

Otto et al., "Information Society Technologies. Actual and dynamic MAP for transport telematic applications (Project No. IST-2011-34141; Deliverable No. D 3.2)—ActMAP Specification," ACTMAP, Oct. 2004.
Otto H U et al: "The actmap approach-specifications of incremental map updates for advanced in-vehicle applications," 2005, www.teleatlas.com.
EP Search Report for EP 11150239, mailed Jun. 8, 2011.

*Primary Examiner* — Anteneh Girma
(74) *Attorney, Agent, or Firm* — Lowe Hauptman & Ham, LLP

(57) ABSTRACT

A map update data supply device and method includes an update map database of per section versions of an update data file, and a request update data extraction unit for extracting a request update section and an update data file. A safeguard update data extraction unit extracts a safeguard update section to safeguard a road network connection between adjacent sections. An integrated data generation unit integrates all versions of the update data file for each extracted request update section and generates a request update integrated data file. The integrated data generation unit integrates, per safeguard update section, versions of the update data file up to the update safeguard version for each extracted safeguard update section, and generates a safeguard update integrated data file. An integrated data supply unit supplies the generated request update integrated data file and the safeguard update integrated data file to a navigation device.

12 Claims, 16 Drawing Sheets

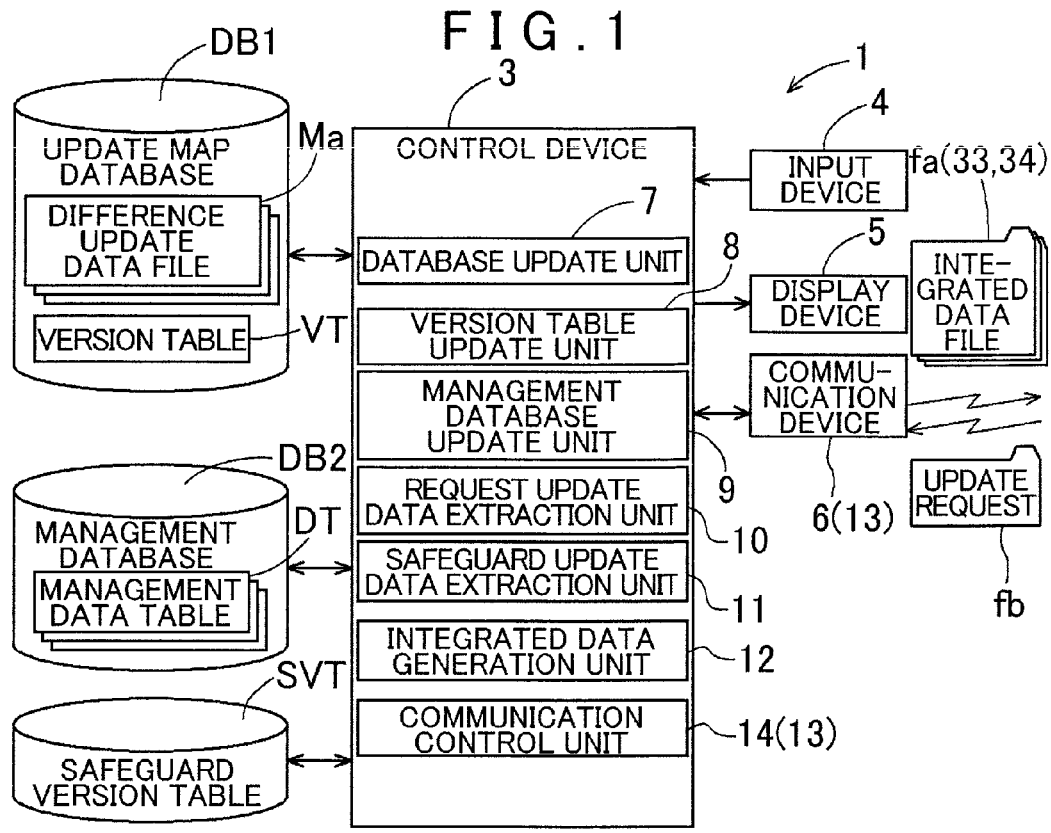
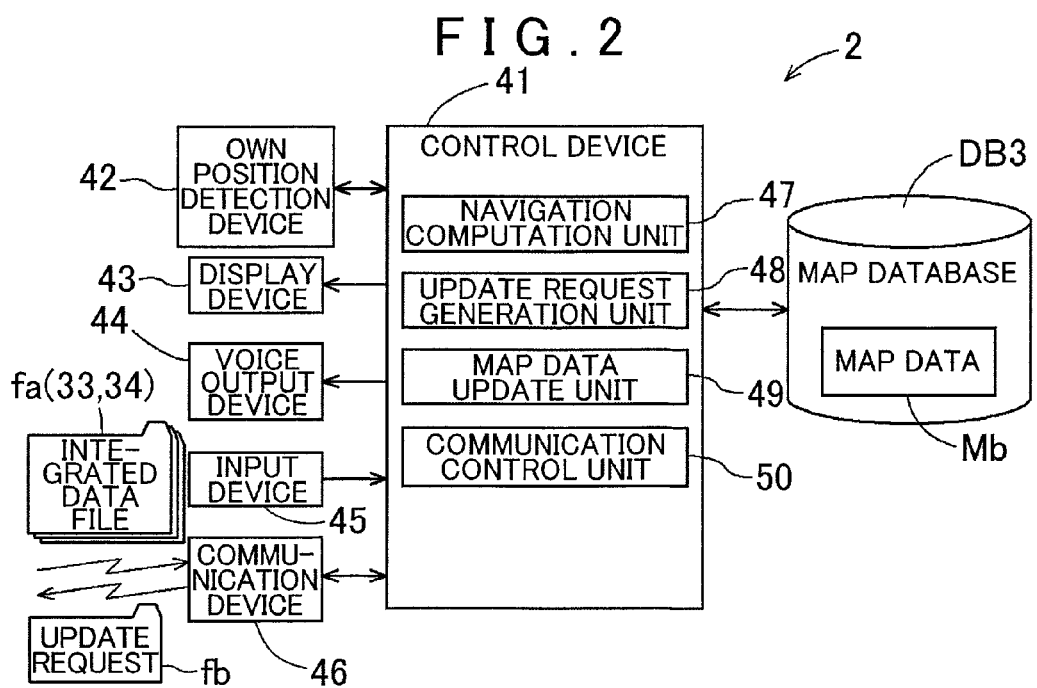

FIG. 6

| DATA SIZE | FORMAT |
|---|---|
| | ROAD DATA |
| | DELETION { |
| 4 | ROAD ID |
| | } |
| | ADDITION { |
| 4 | ROAD ID |
| 1 | ROAD TYPE |
| 4 | START POINT INTERSECTION ID |
| 4 | END POINT INTERSECTION ID |
| 2 | VARIOUS FLAGS |
| 2 | EXTENSION DATA YES/NO FLAG |
| 2 | ROAD LENGTH |
| 4 | CLASSIFICATION, WIDTH, ETC. |
| 1 | ONE-WAY FLAG |
| | } |
| | MODIFICATION { |
| 4 | ROAD ID |
| 1 | UPDATE YES/NO FLAG { |
| bit6 | YES/NO FLAG FOR ONE-WAY FLAG |
| bit5 | YES/NO FLAG FOR CLASSIFICATION, WIDTH, ETC. |
| bit4 | YES/NO FLAG FOR ROAD LENGTH |
| bit3 | YES/NO FLAG FOR EXTENSION DATA YES/NO FLAG |
| bit2 | YES/NO FLAG FOR VARIOUS FLAGS |
| bit1-0 | ROAD TYPE |
| | } |
| 2 | VARIOUS FLAGS |
| 2 | EXTENSION DATA YES/NO FLAG |
| 2 | ROAD LENGTH |
| 4 | CLASSIFICATION, WIDTH, ETC. |
| 1 | ONE-WAY FLAG |
| | } |

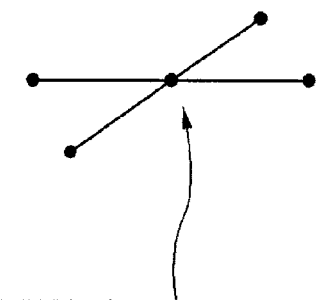

ROAD DELETION, ADDITION, MODIFICATION DATA SIZES
· DELETION: ID (4 BYTES)= 4 BYTES
· ADDITION: ID (4 BYTES)+ ATTRIBUTES (20 BYTES)= 24 BYTES
· MODIFICATION: ID (4 BYTES) +ATTRIBUTES (12 BYTES)= 16 BYTES

FIG. 7

| MANAGEMENT DATA TABLE | — DT |
|---|---|
| NAVIGATION DEVICE ID, LATEST SUPPLY DATE | |
| SECTION ID | CURRENT VERSION |
| A1 | 4 |
| A2 | 4 |
| A3 | 3 |
| A4 | 3 |
| ⋮ | ⋮ |

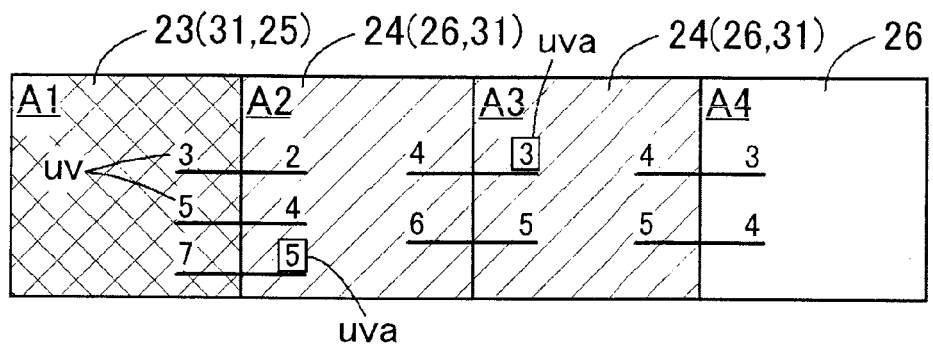
FIG. 9A
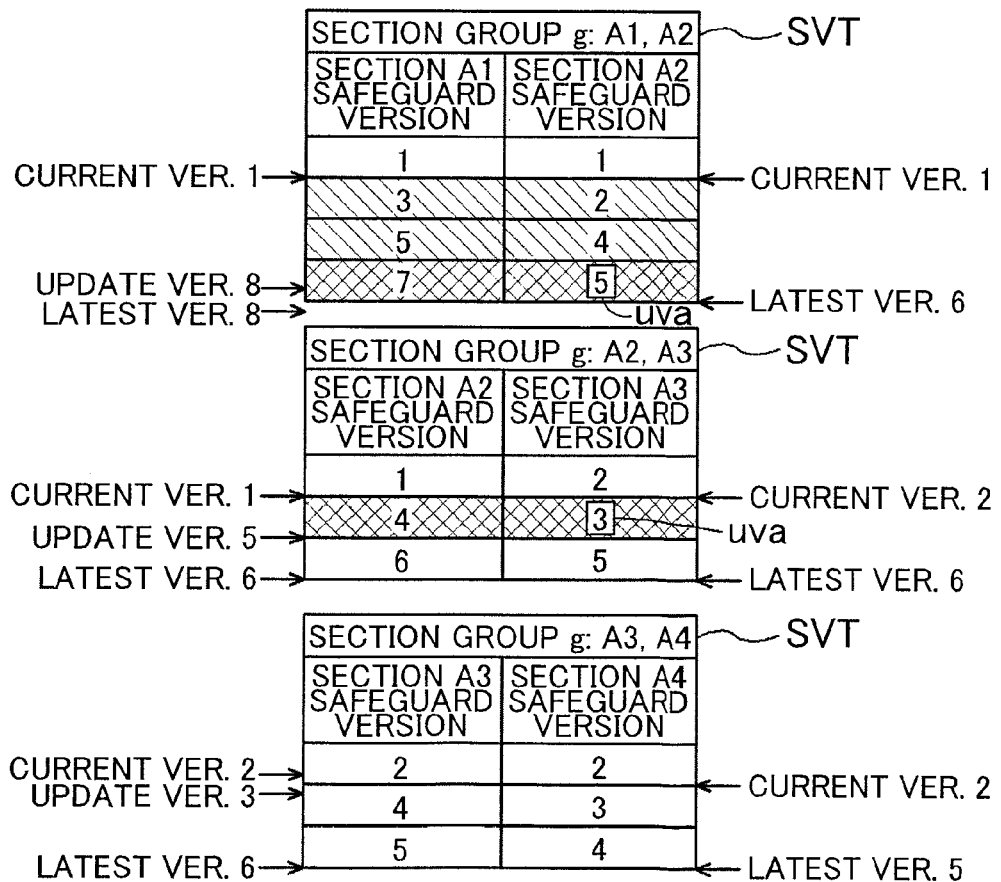
FIG. 9B
FIG. 9C

FIG. 10

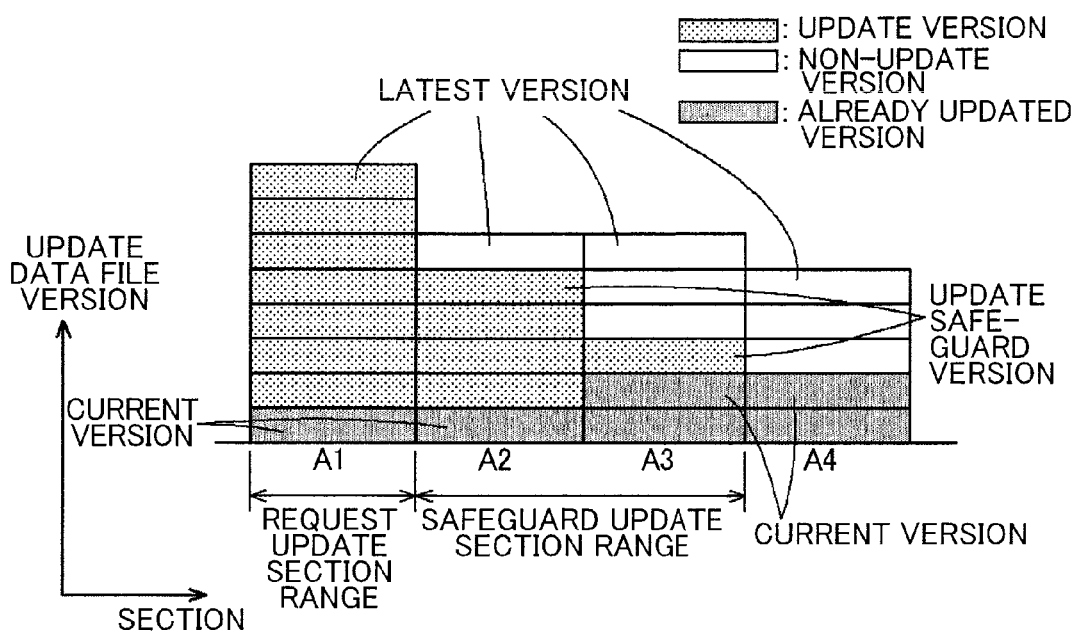

FIG. 11

CASE 1: ADDITION ULTIMATELY DELETED

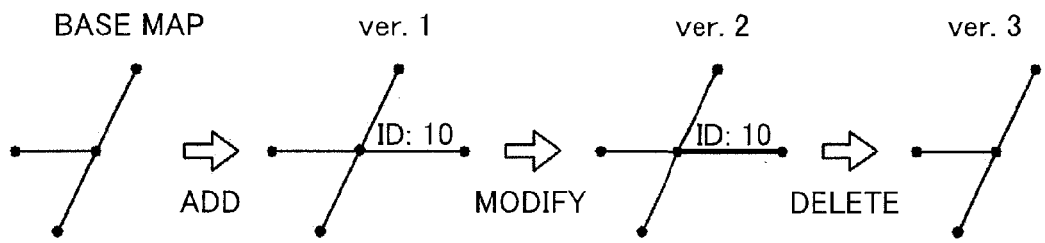

<WITHOUT INTEGRATION>

VER. 1: ROAD ADDITION
→ ID (4 BYTES)+ATTRIBUTES (20 BYTES) SUPPLIED
VER. 2: ATTRIBUTE MODIFICATION
→ ID (4 BYTES)+ATTRIBUTES (12 BYTES) SUPPLIED
VER. 3: ROAD DELETION
→ ID (4 BYTES) SUPPLIED

⇩

UPDATE DATA FOR 3 DIFFERENCE UPDATES SUPPLIED (44 BYTES TOTAL)

<WITH INTEGRATION>

AFTER ADDITION OF ROAD WITH ID: 10, THIS ROAD IS ULTIMATELY DELETED, SO NO UPDATE DATA RELATED TO ROAD OF ID: 10 IS SUPPLIED

⇩

NO UPDATE DATA (0 BYTES)

FIG. 12

| CASE \ VERSION | ver. 1 ADDITION | ver. 2 MODIFICATION | ver. 3 MODIFICATION | ver. 4 DELETION | WITHOUT INTEGRATION NUMBER OF UPDATES | WITHOUT INTEGRATION TOTAL DATA SIZE | WITH INTEGRATION UPDATE CONTENT | WITH INTEGRATION NUMBER OF UPDATES | WITH INTEGRATION TOTAL DATA SIZE SIZE(byte) |
|---|---|---|---|---|---|---|---|---|---|
| 1 | ○ | ○ | — | ○ | 3 | 44 | — | 0 | 0 |
| 2 | ○ | ○ | ○ | ○ | 4 | 60 | — | 0 | 0 |
| 3 | ○ | — | — | ○ | 2 | 28 | — | 0 | 0 |
| 4 | — | ○ | — | ○ | 2 | 20 | DELETION | 1 | 4 |
| 5 | — | ○ | ○ | ○ | 3 | 36 | DELETION | 1 | 4 |
| 6 | — | — | — | ○ | 1 | 4 | DELETION | 1 | 4 |
| 7 | — | ○ | — | — | 1 | 16 | MODIFICATION | 1 | 16 |
| 8 | — | ○ | ○ | — | 2 | 32 | MODIFICATION | 1 | 16 |
| 9 | ○ | ○ | — | — | 2 | 40 | ADDITION | 1 | 24 |
| 10 | ○ | ○ | ○ | — | 3 | 56 | ADDITION | 1 | 24 |
| 11 | ○ | — | — | — | 1 | 24 | ADDITION | 1 | 24 |
|  |  |  |  |  | 24 | 360 | — | 8 | 116 |

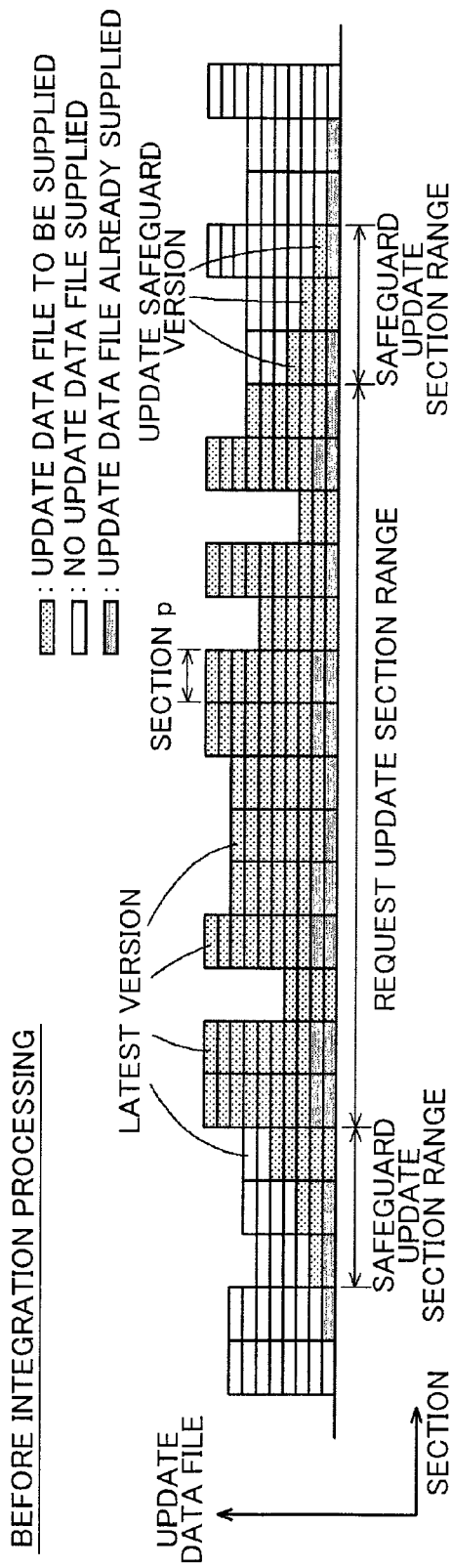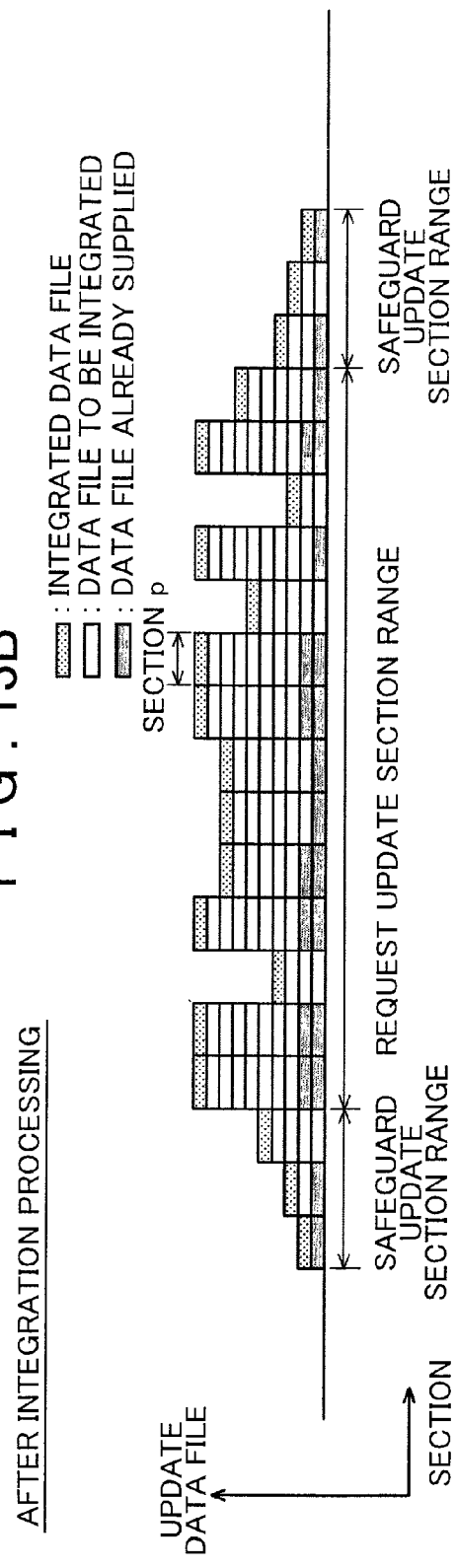

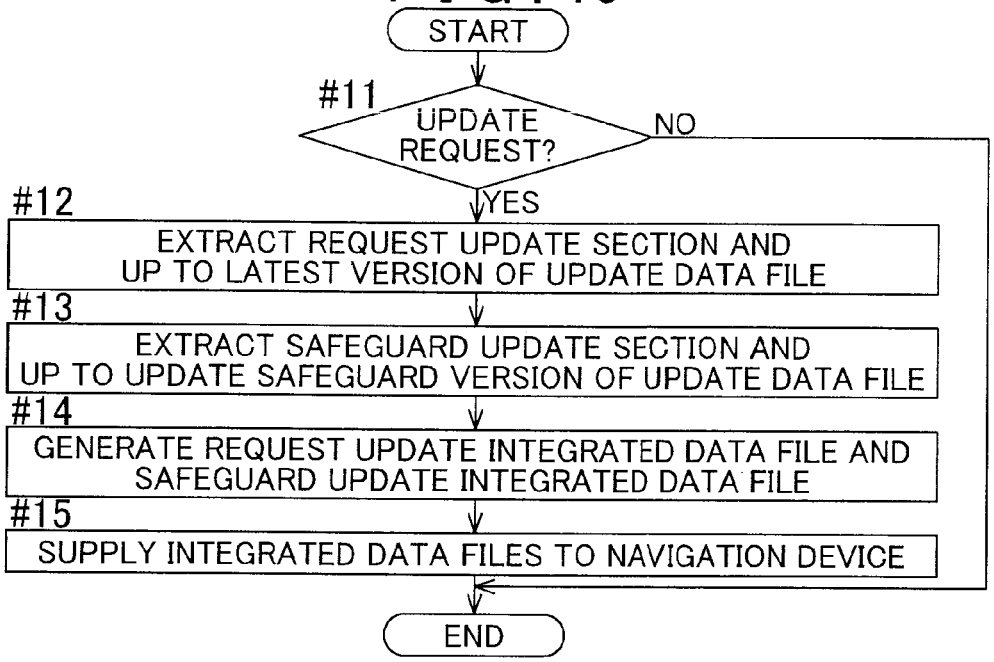
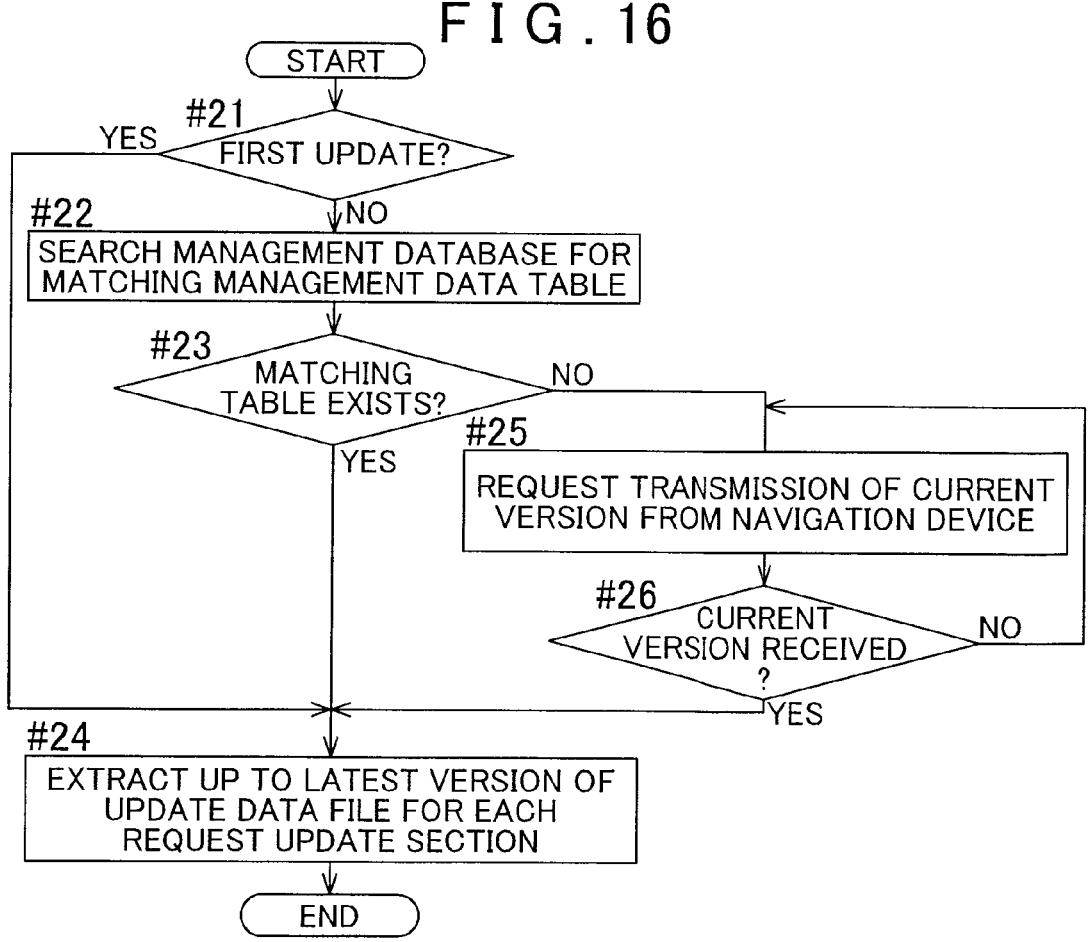

MAP UPDATE DATA SUPPLY DEVICE AND METHOD

The disclosure of Japanese Patent Application No. 2010-019578 filed on Jan. 29, 2010 is incorporated herein by reference in its entirety.

BACKGROUND

Embodiments described herein are of a map update data supply device and uses thereof. Although the device has several uses, the device is described for supplying data for updating map data to a navigation device having map data.

DESCRIPTION OF THE RELATED ART

Heretofore known art partially updates the content of map data for a road map or the like that is used by a navigation device. For example, in order to maintain a newly built road up to portions that connect to existing main roads as one data group, a device described in Japanese Patent Application Publication No. JP-A-2004-178248 includes a data group table that stores a series of link members that constitute the new road. The navigation device may request an update of some sections of map data that is divided into a plurality of sections. At such time, if the new road stored in the data group table also extends into other sections besides those for which an update is requested, update information of the new road is fully provided to the navigation device by referring to the data group table.

A break in a road between adjacent sections can thus be prevented, even when update information is provided for only some sections of map data as specified by the navigation device. Therefore, even after an update of only some sections, a route search can be appropriately performed and the appearance of a map display can also be improved.

SUMMARY

According to the device described in JP-A-2004-178248, the data group table is configured so as to store a series of link members that constitute a new road. However, if, for example, there are many new roads or a new road extends for a long distance, the quantity of information for the link members registered in the data group table and the like grows larger, and the volume of data in the data group table also increases.

Further, since the data group table is configured to store a series of link members that constitute a new road, when a pre-existing road changes in relation to the new road in a section other than the section for which an update is requested, an appropriate update cannot be performed regarding the changed location. As a consequence, a connection relationship between the new road and the pre-existing road may not be correct, and could result in an inability to appropriately perform a route search or other operation.

In order to reduce the volume of update data supplied to the navigation device, a configuration may be used in which only difference update data regarding a changed location is supplied for map data included in the navigation device. In such case, if update data for a road extending into a section other than the section for which an update is requested spans a plurality of versions of difference update data, it is difficult to generate the data group table mentioned above.

In addition, when supplying difference update data, a plurality of versions of difference update data may also be transmitted for the same section. In such case, transmitting the plurality of versions of difference update data without modification will result in duplicate data among the different versions being supplied. Consequently, the volume of data supplied increases and the processing load of the navigation device also increases accordingly due to the duplicate update processing performed.

Each of the inventors learned that is thus desirable to realize a map update data supply device and a map update data supply program which safeguard a road network connection between a section to be updated and another section when a difference update of map data in a navigation device is performed, and also reduce the time and processing load required for updating map data while keeping a volume of data in an update data file to be supplied to the navigation device small.

In order to achieve the above, a map update data supply device, according to disclosed embodiments, supplies data for updating a map database to a navigation device that has the map database, with the map database including at least road network information and divided into a plurality of sections. At least one embodiment of the map update data supply device includes: an update map database that manages per section versions of an update data file for difference updating the map database, and stores per section versions of the update data file; a request update data extraction unit that, based on an update request from the navigation device, extracts a request update section that is a section subjected to a difference update, and extracts for each request update section up to the latest version of the update data file to be supplied to the navigation device; a safeguard update data extraction unit that, if all the request update sections are updated up to the latest version, extracts a safeguard update section that is a section requiring an update to safeguard a road network connection between adjacent sections, and extracts for each safeguard update section the update data file up to an update safeguard version, which is a version requiring an update to safeguard the road network connection; an integrated data generation unit that integrates per request update section up to the latest version of all the update data files for each request update section extracted by the request update data extraction unit and generates a request update integrated data file that serves as a data file for one difference update, and integrates per safeguard update section up to the update safeguard version of the update data file for each safeguard update section extracted by the safeguard update data extraction unit and generates a safeguard update integrated data file that serves as a data file for one difference update; and an integrated data supply unit that supplies to the navigation device the request update integrated data file and the safeguard update integrated data file generated by the integrated data extraction unit.

According to the above embodiment, the update data files for difference updating to a plurality of versions up to the latest version for each request update section are integrated per request update section to generate a data file for one difference update, which is supplied to the navigation device. Therefore, compared to supplying a plurality of versions of the update data file unchanged, the volume of data and the number of data files to be supplied can be reduced.

In addition, the safeguard update section that requires updating to safeguard a road network connection between sections adjacent to the request update section range, and up to the update safeguard version of the update data file, are extracted and supplied to the navigation device. It is thus possible to resolve road network connection discontinuity between adjacent sections around the request update section, which occurs from updating the map database with respect to the request update section, and the road network connection can be safeguarded. At such time, to update the safeguard update section, the update data file, up to the update safeguard version that requires updating to safeguard the road network, is extracted and updated instead of up to the latest version of the update data file. Therefore, the update safeguard version becomes increasingly older than the latest version the farther the section is from the request update section range, and the section range in which the safeguard update sections spread out in a chain manner can thus be narrowed. Consequently, the number of versions of the update data file for the safeguard update sections and the safeguard update section ranges can be kept to the minimum required. In addition, the volume of update data for network safeguarding can be suppressed.

The update data files for difference updating to a plurality of versions up to the update safeguard version for each safeguard update section are integrated per safeguard update section to generate a data file for one difference update, which is supplied to the navigation device. Therefore, compared to supplying a plurality of versions of the update data file unchanged, the volume of data and the number of data files to be supplied can be reduced.

Thus, up to the latest version of update data for the request update section requested by the navigation device is supplied; and for around the request update section, the minimum section range and version of update data that enables safeguarding of the road network is supplied, which improves the convenience and reliability of the navigation device. Further, the number of data files and volume of data supplied to the navigation device can be reduced. Therefore, the distribution time and communication cost when distributing data from the map update data supply device to the navigation device can be reduced, and the update time of the map database in the navigation device can also be reduced, thus improving the convenience of map updating in the navigation device.

In at least one embodiment, each section of the map database is generated from a set of a plurality of data units respectively associated with identification codes. In addition, the update data file in at least one embodiment includes update data that makes any one of an addition, a modification, and a deletion per data unit. The integrated data generation unit, for all versions of the update data file extracted per section, in some embodiments integrates a plurality of versions of update data in which a data unit that did not exist before an update is added and ultimately deleted, such that an update of that particular data unit is not performed; integrates a plurality of versions of update data in which the content of a data unit that existed before an update is modified and ultimately deleted as one piece of data for performing an update that deletes that particular data unit; and integrates a plurality of versions of update data in which a data unit that did not exist before an update is added and modified as one piece of data for performing an update that adds that particular data unit.

According to some embodiments, consideration is given to the significance of an update history that spans a plurality of versions of update data for performing additions, modifications, and deletions with respect to each data unit associated with an identification code. Since update data is integrated as one piece of any one of addition, modification and deletion update data, the volume of data and quantity of update data for each data unit can be reduced.

At least one embodiment further includes a management database that manages a current version of each section in the map database for each of a plurality of navigation devices. In such an embodiment, the request update data extraction unit extracts for each request update section all versions of the update data file that are newer than the current version managed by the management database, up to the latest version stored in the update map database; and the safeguard update data extraction unit extracts for each safeguard update section all versions of the update data file that are newer than the current version, up to the update safeguard version.

According to some embodiments, the current version per section of the update data file supplied to each of a plurality of navigation devices is managed by the management database. Therefore, all required versions newer than the current version can be appropriately extracted for each request update section and safeguard update section. The map update data supply device is thus able to suppress the duplication and extraction of versions already supplied to each navigation device. Therefore, the volume of data and number of update data files to be supplied depending on the navigation device can be minimized. Therefore, the distribution time and communication cost when distributing data from the map update data supply device to each navigation device can be reduced, and the update time of the map database in each navigation device can also be reduced.

In at least one embodiment, each section of the map database is generated from a set of a plurality of data units respectively associated with identification codes, and the update data file has per data unit an update yes/no flag for every data item included in the data unit.

According to some embodiment, the navigation device can use the update yes/no flag to recognize a data item that does not need updating. Therefore, the map database is not updated with respect to data items that do not need updating, and the update time of the map database in the navigation device can be reduced.

In at least one embodiment, the update data file has post-update data for only a data item for which the update yes/no flag indicates there is an update.

According to some embodiments, the update data file need only have post-update data for a data item that requires updating based on the update yes/no flag. Therefore, data for a data item that does not require updating can be excluded from a data unit to be updated, and the volume of data in each data unit can be reduced. Therefore, the distribution time when distributing data from the map update data supply device to each navigation device can be reduced, and the update time of the map database in each navigation device and communication cost can also be reduced.

In at least one embodiment, each section of the map database is generated from a set of a plurality of data units respectively associated with identification codes, and as the data unit includes road data that corresponds to roads that connect intersection points. Update data that adds the road data preferably includes attribute data that is associated with a new identification code corresponding to that particular road data, with the attribute data further including data for a start point intersection and an end point intersection. In addition, in some embodiments, update data that modifies the road data includes post-update attribute data that is associated with the identification code corresponding to that particular road data, with the attribute data not including data for the start point intersection and the end point intersection.

According to at least one embodiment, the update data includes data for a start point intersection and an end point intersection when adding road data, but does not include data for a start point intersection and an end point intersection when modifying road data. It is thus possible to reduce the volume of data depending on whether the form of updating is adding or modifying road data. Therefore, the distribution time and communication cost when distributing data from the map update data supply device to each navigation device can be reduced, and the update time of the map database in each navigation device can also be reduced.

In at least one embodiment, a safeguard version table is further provided that stores, as a safeguard version and associated with a section group that is a combination of a section and a section adjacent thereto in the update map database, a version of the update data file for a section when safeguarding of a road network connection between the sections that constitute the section group is desired; and the safeguard update data extraction unit extracts the safeguard update section based on the safeguard version table, the request update section and the latest version of the request update section, extracts the update safeguard version for each safeguard update section, and extracts up to the update safeguard version of the update data file.

According to at least the above embodiment, the safeguard version table used stores the safeguard version information as associated with the section group. Therefore, in some embodiments, processing that searches the safeguard version table is used to extract the safeguard update section and the update safeguard version. Thus, the computation load of the update data supply device can be reduced, and a shorter update data supply time and a lower cost update data supply device can also be achieved.

A map update data supply program, according to some embodiments, supplies data for updating a map database to a navigation device that has the map database, with the map database including at least road network information and divided into a plurality of sections. In at least one embodiment, the map update data supply program executes in a computer the steps of: using an update map database that manages per section versions of an update data file for difference updating the map database, and stores per section versions of the update data file; extracting, based on an update request from the navigation device, a request update section that is a section subjected to a difference update, and extracting for each request update section up to the latest version of the update data file to be supplied to the navigation device; extracting, if all the request update sections are updated up to the latest version, a safeguard update section that is a section requiring an update to safeguard a road network connection between adjacent sections, and extracting for each safeguard update section the update data file up to an update safeguard version, which is a version requiring an update to safeguard the road network connection; integrating per request update section up to the latest version of all the update data files for each request update section extracted at the request update data extraction step and generating a request update integrated data file that serves as a data file for one difference update, and integrating per safeguard update section up to the update safeguard version of the update data file for each safeguard update section extracted at the safeguard update data extraction step and generating a safeguard update integrated data file that serves as a data file for one difference update; and supplying to the navigation device the request update integrated data file and the safeguard update integrated data file generated at the integrated data extraction step.

According to at least the above embodiment, a plurality of versions up to the latest version of the update data file for the request update section is integrated per request update section to generate a data file for one difference update, which is supplied to the navigation device. Therefore, the volume of data and the number of data files to be supplied can be reduced.

In some embodiments, the safeguard update section and up to the update safeguard version of the update data file are also extracted and supplied. It is thus possible to resolve road network connection discontinuity between adjacent sections around the request update section, and the road network connection can be safeguarded. To update the safeguard update section, an update data file up to an update safeguard version that is at least older than the latest version is extracted and supplied. Therefore, the section range in which the safeguard update sections spread out in a chain manner can be narrowed, and the safeguard update section ranges and the number of update data files for the safeguard update section can be kept to the minimum required.

In addition, a plurality of versions, up to the update safeguard version of the update data file for the safeguard update section, is integrated per safeguard update section to generate a data file for one difference update, which is supplied to the navigation device. Therefore, the volume of data and the number of data files to be supplied can be reduced.

BRIEF DESCRIPTION OF THE DRAWINGS

FIG. 1 is a block diagram of a map update data supply device according to at least one embodiment of the disclosure;

FIG. 2 is a block diagram of a navigation device according to an embodiment of the disclosure herein;

FIG. 6 is a drawing that shows an example of a data format of update data;

FIG. 7 is a drawing that shows an example of a management data table;

FIGS. 9A, 9B, and 9C depict an extraction method of the safeguard update section and the update safeguard version;

FIG. 10 depicts an extraction method of the safeguard update section and the update safeguard version;

FIG. 11 depicts the generation method of an integrated data file;

FIG. 12 depicts the generation method of the integrated data file;

FIGS. 13A and 13B depict an operation and effect of an embodiment of the disclosure herein;

FIG. 15 is a flowchart that shows generation and transmission processing of an integrated data file fa performed by the map update data supply device;

FIG. 16 is a flowchart that shows processing performed by a request update data extraction unit;

DETAILED DESCRIPTION OF THE EMBODIMENTS

Figure 3:
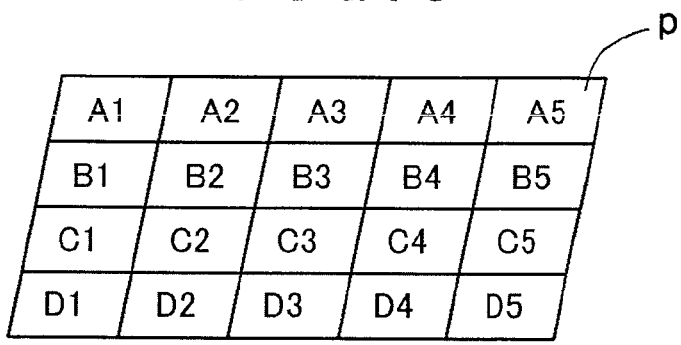
FIG. 3 is an explanatory drawing for explaining the constitution of update map data.

Embodiments are described on the basis of the drawings. FIG. 1 is a block diagram that schematically shows the constitution of a map update data supply device 1 according to an embodiment. FIG. 2 is a block diagram that schematically shows the constitution of a navigation device 2 according to the embodiment. The map update data supply device 1 and the navigation device 2 include communication devices 6, 46, respectively, and are connected in a manner that allows the transmission and reception of data through various types of communication networks. The map update data supply device 1 and the navigation device 2 configure a map data update system overall. The map update data supply device 1 supplies to the navigation device 2 an integrated data file fa for difference updating a map database DB3. The navigation device 2 that received the integrated data file fa updates the map database DB3 on the basis of the integrated data file fa. The features of the map update data supply device 1 and the navigation device 2 according to at least one embodiment will be explained in detail below.

1. Navigation Device 2

As shown in FIG. 2, the navigation device 2 includes the map database DB3, a control device 41, an own position detection device 42, a display device 43, a voice output device 44, an input device 45, and the communication device 46. The control device 41 includes a navigation computation unit 47, an update request generation unit 48, a map data update unit 49, and a communication control unit 50. Here, the navigation computation unit 47 implements basic guidance functions of the navigation device 2. Basic guidance functions of the navigation device 2 include functions such as displaying a surrounding map of the own position or a specified position, calculating a route from a departure point to a destination, providing route guidance to a destination, performing map matching to correct the own position on a road, and searching for a destination. The control device 41 of the navigation device 2 is configured to include computational processing devices such as a CPU, and a storage medium such as a RAM or a ROM for storing software (programs), data, and the like. Each unit 47 to 50 included in the control device 41 has as its core member a computational processing device of the control device 41. Each functional portion for performing various types of processing on data that is input can be implemented by one of hardware, software, and both hardware and software. In addition, the map database DB3 may be stored in a rewritable storage medium such as a hard disk drive or a flash memory, for example.

The navigation device 2 includes a map data update program that is a program for updating map data. The map data update program has steps that correspond to processes performed by the units included in the navigation device 2. The map data update program causes the computational processing devices, for example computers included in the navigation device 2, to execute each step, whereby each process is executed. Although it may not be especially noted in the following descriptions, the map data update program has steps that correspond to the processes performed by the navigation device 2. The features of the respective parts of the navigation device 2 will be described below in succession.

1-1. Map Database DB3

The map database DB3 stores map data Mb, which is map data for navigation purposes to be referenced by the navigation computation unit 27 in order to realize guidance functions of the navigation device 2.

Figure 5:
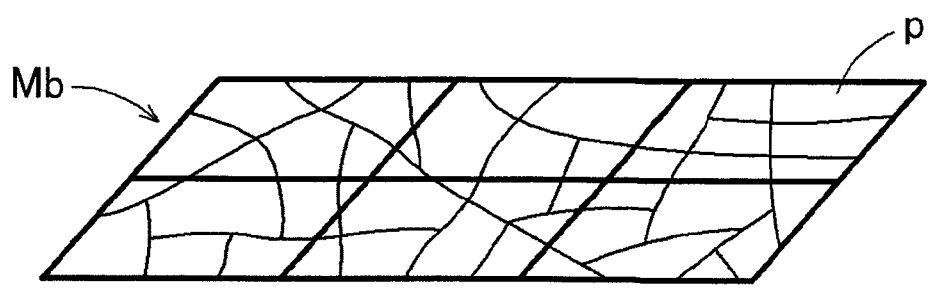
FIG. 5 is a drawing depicting map data included in the navigation device.

The map data Mb within the map database DB3 has as its applicable range of map data an entire area within which navigation is performed (e.g., all of Japan). The map data Mb is divided into m×n (m and n being natural numbers) to form sections p. In at least one embodiment, as shown in FIG. 3, the sections p are set as rectangles of an identical size. The map database DB3 of the navigation device 2 has information on various types of objects; for example, the layout and form of roads, intersections, and paint markers and traffic signals provided along roads, as well as structures such as buildings (residential, office, etc.), bridges and tunnels, natural objects such as rivers and coastlines, and administrative districts. An update data file Ma that will be described later is a data file for difference updating the information within the map database DB3. FIG. 5 is an explanatory drawing for explaining the content of information included the map database DB3. Note that objects other than roads and intersections are omitted in FIG. 5. As shown in FIG. 5, the map data Mb within the map database DB3 has information on objects such as a plurality of roads and the like that exist within each section p and span between a plurality of sections p. It should be noted that, although not shown in the drawing, the map data Mb also has, in some cases, information on various types of objects other than roads, and these objects may span between adjacent sections p. For the purposes of simplifying the description below, information on the especially critical "road" among the various types of objects mentioned above will be used as an example of the content of map data supplied to the navigation device 2.

The map database DB3 for each section p in the navigation device 2 is constituted from a set of a plurality of data units DU respectively associated with identification codes. Various types of data are included in the map data Mb, such as road data, intersection data, restriction data, guidance data, connection data, and branch guidance data. The plurality of data units DU associated with identification codes are constituted per data type.

Figure 14:
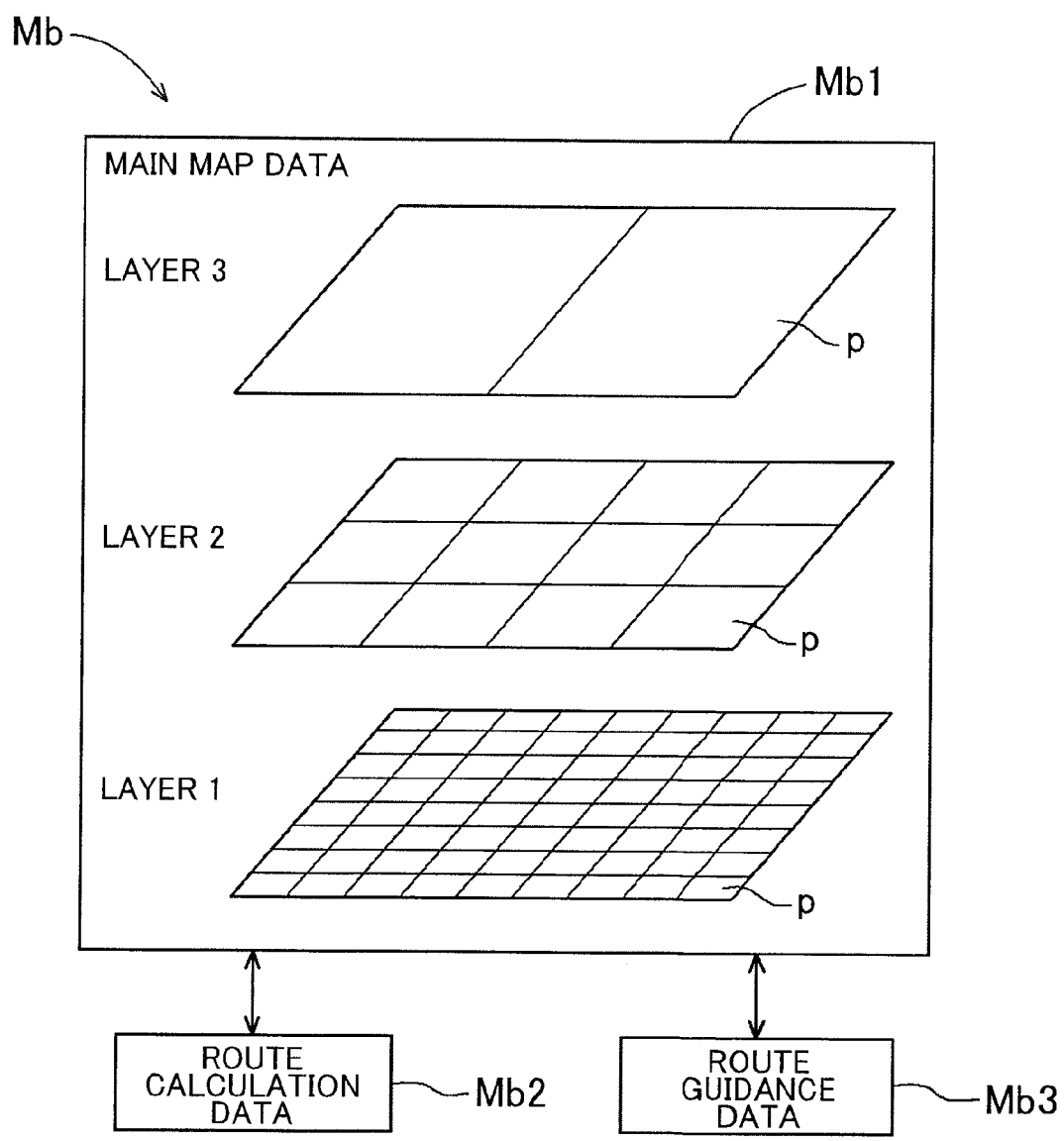
FIG. 14 depicts map data included in the navigation device.

FIG. 14 is an explanatory drawing for explaining the constitution of the map data Mb stored in the map database DB3. As shown in FIG. 14, the map data Mb includes main map data Mb1, route calculation data Mb2, and route guidance data Mb3. Here, the main map data Mb1 is divided into a plurality of layers in accordance with the level of detail of stored information on objects such as roads. In some embodiments, the main map data Mb1 in order from bottom to top has three layers, a layer 1, a layer 2, and a layer 3. A lower layer here includes more detailed information on objects such as roads. Each layer of the main map data Mb1 is divided into a plurality of sections p. In this case, a higher layer is set with sections p that correspond to a wider area. Therefore, one section p of a higher layer includes an area that corresponds to a plurality of sections p of a lower layer. Each layer of the main map data Mb1 includes information on a road network that is constituted from a plurality of links (roads) and a plurality of nodes (intersections). The main map data Mb1 is referenced by the navigation computation unit 27 when displaying a surrounding map of the own position or a specified position, performing map matching to correct the own position on the road, and the like.

The route calculation data Mb2 is associated with the main map data Mb1, and has information on the cost, travel requirements, node correspondence relationships with a higher layer, and the like for each link constituting the road network. The route calculation data Mb2 is referenced by the navigation computation unit 27 when calculating a route from a departure point to a destination. The route guidance data Mb3 is associated with the main map data Mb1, and has information on images, speech, and the like required when providing route guidance from a departure point to a destination. Accordingly, the route guidance data Mb3 is referenced by the navigation computation unit 27 when providing route guidance to a destination.

As described above, in the main map data Mb1 of the map data Mb, the size of the real-world area corresponding to one section p differs depending on the layer. In the present example, the size of the real-world area included in each section p of the layer 1 in the main map data Mb1 corresponds to the size of the area of each section p in the update data file Ma. Therefore, the integrated data file fa supplied by the map update data supply device 1 is a data file in units of sections that correspond to the section p of the layer 1 in the main map data Mb1. Based on the layer 1 data in the main map data Mb1 after difference updating on the basis of the integrated data file fa, the layers 2 and 3 in the main map data Mb1 as well as the route calculation data Mb2 and the route guidance data Mb3 are generated and updated by the map data update unit 49.

1-2. Own Position Detection Device 42

The own position detection device 42 detects the current position of the navigation device 2. Therefore, although not shown in the drawings, the own position detection device 42 is configured to include a GPS receiver, a heading sensor, and a distance sensor, for example. Based on information acquired from these, the own position detection device 42 acquires information on coordinates, a direction of travel, and the like that indicate the current position, and outputs such information to the control device 41. In the control device 41, based on the map data Mb and own position information detected by the own position detection device 42, the navigation computation unit 47 executes processing to display the own position, perform map matching, and the like.

1-3. Display device 43, voice output device 44, input device 45, and communication device 46

The display device 43 is configured to include a liquid crystal display. The voice output device 44 is configured to include a speaker and an amplifier. The display device 43 and the voice output device 44 are controlled and operated by the navigation computation unit 47, and respectively output a display and speech for displaying the own position, calculating a route between two points, providing route guidance, searching for a destination, and the like. The input device 45 is configured to include a touch panel that is integrated with the display device 43, operation switches, and a remote controller. The input device 45 accepts operational input from a user, and outputs the content of such operational input to the control device 41. The communication device 46 has a configuration that enables communication with and the transmission and reception of data to and from the communication device 6 of the map update data supply device 1 through various types of known wired or wireless communication networks.

1-4. Control Device 41

As mentioned above, the control device 41 includes the navigation computation unit 47, the update request generation unit 48, the map data update unit 49, and the communication control unit 50. The navigation computation unit 47, as described earlier, implements basic guidance functions of the navigation device 2 such as displaying a surrounding map of the own position or a specified position, calculating a route from a departure point to a destination, providing route guidance to a destination, performing map matching to correct the own position on a road, and searching for a destination. Although not shown in the drawings, in at least some embodiments, the navigation computation unit 47 has five application programs that serve as navigation operation programs: a display program, a map matching program, a route calculation program, a guidance program, and a search program. The operation processes of the navigation device 2 performed by these application programs are known, and will therefore not be explained in detail here. Also note that the map data Mb is referenced and used in the application programs.

The update request generation unit 48 generates an update request fb, which is formed of an update request map range 51 and identification information, to be transmitted to the map update data supply device 1. The update request generation unit 48 determines the update request map range 51 and generates the update request fb, which is used to request the integrated data file fa for the update request map range 51 from the map update data supply device 1. In some embodiments, the update request map range 51 includes a map range currently requested and a map range that is highly likely to be requested in the future. It should be noted that the map range may be a section range. For example, the update request map range 51 may correspond to a map range within a prescribed radial distance from a position registered as a home position, or a map range that includes the surroundings of the current own position detected by the own position detection device 42, the surroundings of a destination, the surroundings of a route set to a destination, or the like. When determining the above-described update request map range 51, the map range is in some embodiments configured as a minimum required range, e.g., the map range to be updated around the home position is set wide while the map range to be updated around a route to a destination is set narrow.

If a request to perform update processing for a map specified by the user of the navigation device 2 is received, the thus specified map range is set as the update request map range 51. In this case, the update request map range 51 corresponds to an administrative section range or the like, such as one, two, or more prefectures specified by the user. The update request fb is generated as a data file that includes information for specifying the update request map range 51, e.g., map coordinate information, central coordinate information and radial distance information, and specified city and metropolitan information. Alternatively, if the map range is a section range, the update request fb is generated as a data file that includes section ID information and the like, which are used in common with the update data file Ma of the map update data supply device 1.

The identification information includes information required by the map update data supply device 1 to specify the navigation device 2 and the content of update data supplied in the past. In at least one embodiment, the identification information includes an identification code such as a serial number of the navigation device 2, as well as information on the latest supply date of update data and the like. In the identification information, the navigation device 2 may also include latest version information of the sections p for which update data was supplied.

The map data update unit 49 difference updates the map data Mb based on the integrated data file fa supplied by the map update data supply device 1. As will be described later, in at least one embodiment, the integrated data files fa are files that include map data for difference updating a request update section 23 that is determined based on the update request map range 51, and a safeguard update section 24 that is a surrounding section range of the request update section 23. Accordingly, the map data update unit 49 updates the map data Mb by difference updating the map data of the section p that corresponds to the request update section 23 and the safeguard update section 24 in the layer 1 of the main map data Mb1 of the map data Mb, based on the map data of the request update section 23 and the safeguard update section 24 included in the integrated data file fa.

The communication control unit 50 performs an operation control of the communication device 46. Specifically, the communication control unit 50 controls communication between the navigation device 2 and the map update data supply device 1 using the communication device 46, and causes the communication device 46 to perform operations to transmit the update request fb to the map update data supply device 1, receive the integrated data file fa transmitted from the map update data supply device 1, and the like.

2. Map Update Data Supply Device 1

As shown in FIG. 1, the map update data supply device 1 includes an update map database DB1, a management database DB2, a safeguard version table SVT, a control device 3, an input device 4, a display device 5, and the communication device 6. The control device 3 includes a database update unit 7, a version table update unit 8, a management database update unit 9, a request update data extraction unit 10, a safeguard update data extraction unit 11, an integrated data generation unit 12, an integrated data supply unit 13, and a communication control unit 14. Here, the control device 3 is configured to include computational processing devices such as a CPU, and a storage medium such as a RAM or a ROM for storing software (programs), data, and the like. Each unit 7 to 14 included in the control device 3 has as its core member a computational processing device of the control device 3. Each functional portion for performing various types of processing on data that is input can be implemented by one of hardware, software, and both hardware and software. In addition, in at least some embodiments, the update map database DB1, the management database DB2, and the safeguard version table SVT are stored in a rewritable storage medium such as a hard disk drive or a flash memory, for example.

The map update data supply device 1 includes a map update data supply program that is a program for supplying map update data. The map update data supply program has steps that correspond to processes performed by the units included in the map update data supply device 1. The map update data supply program causes the computational processing devices, e.g., computers, included in the map update data supply device 1 to execute each step, whereby each process is executed. Although it may not be especially noted in the following descriptions, the map update data supply program has steps that correspond to the processes performed by the map update data supply device 1. The constitutions of the respective parts of the map update data supply device 1 will be described below in succession.

2-1. Update Map Database DB1

Figure 4:
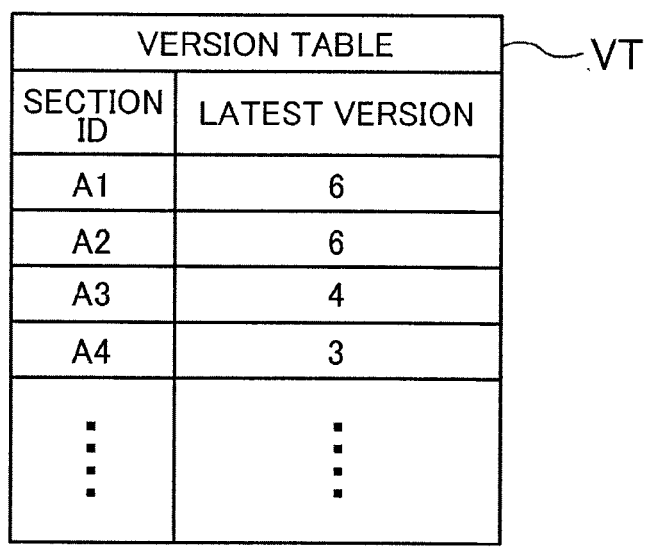
FIG. 4 is a drawing that shows an example of a version table.

The update map database DB1 manages per section p versions of the update data file Ma for difference updating the map database DB3, and also stores per section p versions of the update data file Ma. In at least one embodiment, a section ID (A1, A2, etc.) is set for each section p, and the versions of the sections p are managed per section ID as shown in FIG. 3. A version upgrade per section p is performed each time new information is input by the input device 4, and the update data file Ma for difference updating the section p is newly generated by the database update unit 7. The update data files Ma are stored and managed in the update map database DB1, together with the section ID and version information. In at least one embodiment, the oldest update data file Ma for difference updating first created for the initial map database DB3 is designated as version 1 (Ver. 1). The version is upgraded to version 2 (Ver. 2), version 3 (Ver. 3) and so forth each time the update data file Ma is generated for a section ID based on new information. In the present embodiment, the latest version of the section p is recorded in a version table VT stored in the update map database DB1 to facilitate searching. The version table VT is updated when a new version of the update data file Ma for the section p is generated. In the present example, as shown in FIG. 4, the version table VT is a data table that records the latest version of each section ID. According to the example shown in FIG. 4, the latest version of the sections A1 and A2 is currently 6, the latest version of a section A3 is 4, and the latest version of a section A4 is 3. Note that, although at least one embodiment is provided with the version table VT, the update data file Ma stored in the update map database DB1 may be searched in order to search for the latest version of the section p instead of providing the version table VT. In addition, the version information may be managed together with information related to the date each version of the update data file Ma was generated.

The update data file Ma for the section p, which is a data file for difference updating the map database DB3 for the section p, is constituted from an accumulation of update data for difference updating that makes additions, modifications, and deletions per data unit DU. FIG. 6 shows a data format example of deletion, addition, and modification update data. Here, FIG. 6 shows in particular critical road data among the various types of data included in the map database DB3, which will be described in detail below.

The deletion update data has identification code data that specifies the identification code of the data unit DU to be deleted. The identification code is a road ID in the road data. In the present example, the data size of the identification code is 4 bytes. Supplying the deletion update data having specific identification code data to the navigation device 2 results in the navigation device 2 deleting from the map database DB3 the data unit DU of the specific identification code.

The addition update data includes all data required to form one data unit DU in the map database DB3. In at least one embodiment, the addition update data is constituted from an identification code and attribute data. Here, the attribute data is data related to a subject matter specified by the identification code. The attribute data in the addition update data is constituted from all data related to the subject matter specified by the identification code. In the road data example shown in FIG. 6, in addition to the road ID that is the identification code of the data unit DU, the addition update data includes as data items of the attribute data: a road type; a start point intersection ID; an end point intersection ID; various flags; a yes/no flag for an extension data flag; a road length; a classification, width, etc.; and a one-way flag. The data items of the attribute data in the present example respectively have data sizes of 1, 4, 4, 2, 2, 2, 4, and 1 byte, as shown in FIG. 6. The overall data size of the addition update data is 24 bytes, which is the sum of the 4 bytes of the identification code and the 20 bytes of the attribute data.

Here, the data items of the attribute data in the road data are described. The road type refers to data that specifies a road classification such as expressway or local road, and in the present example, the road type is expressed in 2 bits. Given that the road data is data on roads that connect intersections, the start point intersection ID and the end point intersection ID refer to data for specifying intersections that are respectively the start point and end point of a road. Here, the term intersection is used in the broadest sense as a point that segmentalizes a road and has certain specific coordinates; however, the intersection is not necessarily a point at which two or more roads cross. It should be noted that the attribute data of each intersection ID is stored in intersection data that is separate from the road data, and the intersection data is constituted from a data unit DU associated with the intersection ID, which is also the identification code. If an intersection addition is to be made in accordance with the addition update data of the road data, addition update data for the intersection data is generated. Next, the various flags are flag data that expresses whether any of various types of roads applies, e.g., whether a road is a motor road, a toll road, a bridge, or a tunnel, which are allocated per bit of the various flags data. The extension data yes/no flag is flag data that expresses whether various types of extension data are present or absent, e.g., the presence/absence of VICS data, the presence/absence of a railroad crossing, the presence/absence of seasonal restriction data, and the presence/absence of road numbers, which are allocated per bit of the extension data yes/no flag data. The various types of extension data are stored separate from the road data, and include restriction data, guidance data, and the like. The road length is data on the length of a road from the start point intersection to the end point intersection. The classification, width, etc. are data that expresses the detailed classification, width, and the like of a road. The one-way flag is flag data that expresses whether only one-way traffic is allowed, the type of one-way traffic, and the like. Note that the flag is binary data that expresses 0 or 1, or the like. In the present example, the flag is binary data expressed by a 0 or 1 in the bit of each column when the data is expressed in binary notation. One-byte flag data has eight bits and represents a maximum of eight flags. In addition, the data items of the attribute data may be set according to data type, such as road data, intersection data, restriction data, and guidance data, and thus set as various types of common data items.

The modification update data has identification code data that specifies the data unit DU of the identification code to be modified, and attribute data that is used to modify various types of data within the data unit DU. At least one embodiment, as attribute data, the modification update data has an update yes/no flag that expresses whether there is an update per data item of the attribute data subject to modification, and post-update data for each data item of the attribute data subject to modification. In the road data example shown in FIG. 6, in addition to the road ID that is the identification code of the data unit DU, the modification update data includes: an update yes/no flag; various flags serving as data of the data items of the attribute data subject to modification; a yes/no flag for an extension data flag; a road length; a classification, width, etc.; and a one-way flag. According to the present example, the update yes/no flag is flag data that expresses whether there is an update of each data item per bit, and has a data size of one byte. The allocation of data items per bit are as follows. Various flags are bit 2; the yes/no flag for the extension data flag is bit 3; the road length is bit 4; the classification, width, etc. is bit 5; and the one-way flag is bit 6. Note that, in the present example, the road type data is allocated by effectively utilizing bits 0 and 1, which are extra bits not allocated with flag data out of the one byte used for the update yes/no flag.

Update data that modifies the road data includes the data items of the post-update attribute data. This does not include the data items of the start point intersection ID and the end point intersection ID associated with the road ID, which is the identification code corresponding to that particular road data. Therefore, compared to the addition update data, the volume of modification update data can be reduced because the modification update data excludes the data items of the start point intersection ID and the end point intersection ID from the attribute data. As described above, the road data is data on roads that connect intersections of two specific IDs, so an update that modifies the road data does not include modifications of the start point intersection ID and the end point intersection ID. In order to modify the start point intersection ID and the end point intersection ID of the road data, an update to delete the road data is first performed, and then an update to add road data with the modified start point intersection ID and end point intersection ID is performed. When performing an update to add road data that modifies the start point intersection ID or the end point intersection ID, the road ID that is the identification code changes.

In at least one embodiment, the modification update data of the road data, regardless of whether there is an update of each data item of the attribute data, includes the data of all data items, which are all data items with a potential to be updated, except for the start point intersection ID and the end point intersection ID. Thus, as shown in FIG. 6, the overall data size of the modification update data is 16 bytes, which is the sum of the 4 bytes of the identification code and the 12 bytes of the attribute data formed of the data items and the update yes/no flag. The volume of modification update data is less than 24 bytes, which is the data size of the addition update data.

In at least one embodiment, navigation device 2 is configured so as to update the map database DB3 with regard to only the data items for which there is an update, based on the supplied update yes/no flag data. Accordingly, the update time of the map database in the navigation device can be decreased.

In an embodiment, a configuration is used in which the modification update data includes the data of all data items except for the start point intersection ID and the end point intersection ID, regardless of whether there is an update of each data item of the attribute data. However, a configuration may be used in which the modification update data includes the post-update data of only the data items for which the update yes/no flag indicates there is an update. With such a configuration, the data size of the modification update data can be further reduced. Moreover, in this case, the modification update data may be constituted without the update yes/no flag.

2-2. Management Database DB2

The management database DB2 manages the current versions of the sections p in the map database DB3 for each of a plurality of navigation devices 2. When the update data file Ma is supplied to the navigation device 2, the management database DB2 is updated by the management database update unit 9 using the supplied version of the section p. In an embodiment, the management database DB2 stores a management data table DT that is generated per navigation device 2. As shown in FIG. 7, the management data table DT records a current version per section ID, and records an identification code such as the serial number of the navigation device 2 together with identification information such as the latest supply date. It should be noted that the current version is the newest version among the versions of the update data file for the section p supplied in the past.

Thus, the map update data supply device 1 uses the management database DB2 to self-manage the versions of the update data file Ma that are supplied to the navigation device 2. Therefore, the map update data supply device 1 can reduce the communication time to acquire the current version information of the map database DB3 for each section p from each navigation device 2 through communication, and decrease the data update time of the navigation device 2.

2-3. Safeguard Version Table SVT

The safeguard version table SVT stores, as a safeguard version va and associated with a section group g that is a combination of the section p and a section p adjacent thereto of the update map database DB1, a version of the update data file Ma for the section p when it is necessary to safeguard a road network connection between the sections p that constitute the section group g.

In other words, when the update data file Ma is generated for a road that pertains to a road network connection between adjacent sections p, the versions of the update data file Ma for those particular sections p at such time are cumulatively recorded in the safeguard version table SVT as the safeguard versions va of the sections p in the section group g formed of the two adjacent sections p.

The safeguard version table SVT is thus provided as storing the safeguard version va associated with the section group g. Therefore, using a simple process to search the safeguard version table SVT, it is possible to determine the necessity of a network safeguard for the section group g and extract an update safeguard version uva. In addition, the computation load of the update data supply device 1 can be reduced. The safeguard version table SVT also cumulatively records the safeguard version va up to the present for the section group g. Therefore, as described later, the safeguard version table SVT is used, in some embodiments, to extract a safeguard update section 24 back to a past safeguard version va. It is thus possible to narrow a section range in which the safeguard update sections 24 spread out in a chain manner, and execute extraction using a simple process.

Figure 8:
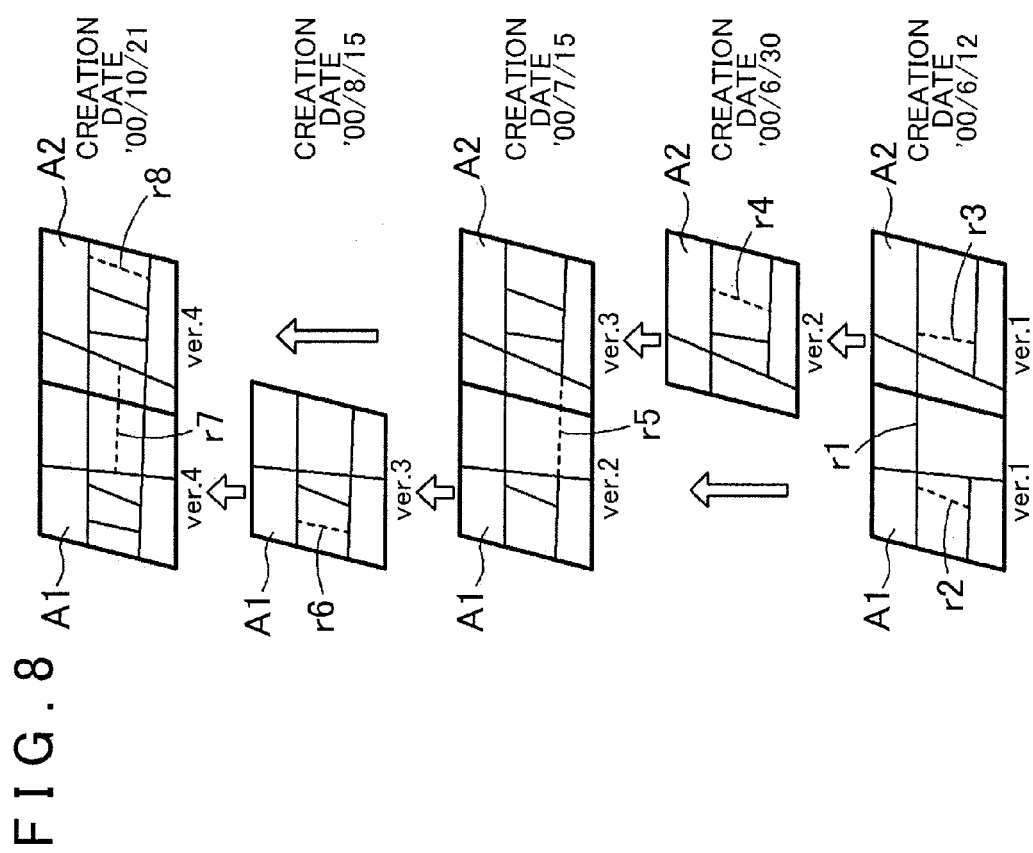
FIG. 8 depicts a determination method of a safeguard version.

Referring to FIG. 8, one embodiment of a method of updating the safeguard version table SVT will be described. Note that the series of processes pertaining to FIG. 8 are executed by the version table update unit 8 and the database update unit 7. In the section group g that has a section Al and a section A2, as shown in FIG. 8, there is a road r1 that spans between the two adjacent sections p in the initial map database DB3. In the update data file Ma with a creation date of Jun. 12, 2000, in the section A1, a road r2 that does not span between two adjacent sections p is newly added. Version 1 of the update data file Ma for performing a difference update that adds the road data of the road r2 is thus generated. Meanwhile, with the same creation date of Jun. 12, 2000, in the section A2, a road r3 that does not span between two adjacent sections p is newly added, and version 1 of the update data file Ma for performing a difference update that adds the road data of the road r3 is thus generated. Here, for ease of understanding, FIG. 8 shows the map data of the section A1 and the section A2 concerning the same creation date arranged side by side. Next, with a creation date of Jun. 30, 2000, in the section A2, a road r4 that does not span between two sections p is newly added. The update data file Ma that is upgraded to version 2, which adds the road data of the road r4, is generated accordingly.

Note that since none of the roads r2, r3, and r4 added on Jun. 12, 2000 and Jun. 30, 2000 are roads that span between adjacent sections p, there is no need for a network safeguard. Accordingly, the generated update data file Ma for the section p that adds no road data of a road spanning between adjacent sections p is an update data file Ma that does not require a network safeguard. Consequently, the version of such an update data file Ma is not used as the safeguard version va.

Next, with a creation date of Jul. 15, 2000, a road r5 that spans between the section Al and the section A2, i.e., two adjacent sections p, is newly added. Thus, the update data file Ma that is upgraded to version 2, which adds the road data of the road r5, and the update data file Ma that is upgraded to version 3, which adds the road data of the road r5, are generated for the section Al and the section A2, respectively. The added road r5 spans between sections p, and is thus a road that pertains to a road network connection between adjacent sections p and requires a network safeguard. In view of the addition of a road that spans between adjacent sections p as described above, the generated update data files Ma for the adjacent sections p pertaining to this road are update data files Ma that require a network safeguard. Consequently, these versions of the update data files Ma are used as the safeguard versions va. The safeguard versions va of the adjacent sections p are additionally recorded in the safeguard version table SVT as the safeguard versions va of the section group g formed of the adjacent sections p. In the example of FIG. 8, with regard to the section group g formed of the sections A1 and A2, a safeguard version group (A1: 2, A2: 3) that sets the safeguard version va of the section A1 as 2 and the safeguard version va of section A2 as 3 is additionally recorded in the safeguard version table SVT.

Next, with a creation date of Aug. 15, 2000, in the section A1, a road r6 that does not span between two sections p is newly added, and the update data file Ma that is upgraded to version 3 and adds the road data of the road r6 is generated accordingly. With a creation date of Oct. 21, 2000, a road r7 that spans between the section A1 and the section A2, i.e., two adjacent sections p, is newly added, and a road r8 that does not span between two sections p is newly added in the section A2. For the section A1, the update data file Ma that is upgraded to version 4, which adds the road data of the road r7, is generated; for the section A2, the update data file Ma that is upgraded to version 4, which adds the road data of the road r7 and the road r8, is generated. As described above, since an update data file that pertains to a road that spans between adjacent sections p is generated, a network safeguard is necessary. Therefore, using the versions of the update data files Ma for the sections p as the safeguard version, the safeguard version group (A1: 4, A2: 4) is additionally recorded in the safeguard version table SVT.

2-4. Input Device 4, Display Device 5, and Communication Device 6

Next, returning to FIG. 1, the input device 4, the display device 5, and the communication device 6 of the map update data supply device 1 will be described. The input device 4 is configured to include various types of devices for input, such as a keyboard, a mouse, a touch panel, and a scanner. Using the input device 4, an operator can perform an update input that adds, modifies, or deletes map information to upgrade the versions of the update data file Ma. The display device 5 is configured to include a liquid crystal display, a CRT display, or the like. When the operator uses the input device 4 to perform an operation, the display device 5 can display the status of the update data file Ma, and the content of an update operation thereof The communication device 6 has a configuration that enables communication with and the transmission and reception of data to and from the communication device 46 of the navigation device 2 through various types of known wired or wireless communication networks. The Internet, a wired or wireless public telephone network, a wired or wireless LAN (Local Area Network), or a private network, for example, may be used as a communication network. Alternatively, the exchange of data between the map update data supply device 1 and the navigation device 2 is preferably performed through separate communication devices such as a personal computer or a storage medium such as various types of memories and disks.

2-5. Control Device 3

As described above, the control device 3 includes the database update unit 7, the version table update unit 8, the management database update unit 9, the request update data extraction unit 10, the safeguard update data extraction unit 11, the integrated data generation unit 12, and the communication control unit 14.

2-5-1. Database Update Unit 7

The database update unit 7 performs processing on the update input that adds, modifies, and deletes map information through the input device 4. In addition, the database update unit 7 performs, based on the update input, processing that generates a new version of the update data file Ma for difference updating, and stores the update data file Ma together with the version information in the update map database DB1. At such time, the generated new version of the update data file Ma is considered to be the latest generated version for the section p, and the latest version corresponding to that particular section p stored in the version VT is updated accordingly.

2-5-2. Version Table Update Unit 8

The version table update unit 8 performs, when the database update unit 7 generates new versions of the update data files Ma requiring a network safeguard for two adjacent sections p as described above, processing that associates the new versions, as the safeguard versions va of the adjacent sections p, with the section group g formed of the two adjacent sections p, and cumulatively records these in the safeguard version table SVT.

2-5-3. Management Database Update Unit 9

The management database update unit 9 performs, when the information of the update data file Ma is supplied to the navigation device 2, processing that updates the management database DB2 based on the supplied version information of the section p. In the present example, the management database update unit 9 updates the management data table DT provided in the navigation device 2 using the section ID of the supplied update data file Ma, and the version thereof. If the section ID to be updated already exists in the management data table DT, only the version is updated; however, if the section ID to be updated does not already exist in the management data table DT, the section ID and the version are added. When updating the management data table DT, the management database update unit 9 also updates identification information such as the identification code of the navigation device 2 and the supply date of the update data, which are included in the update request fb from the navigation device 2.

2-5-4. Request Update Data Extraction Unit 10

The request update data extraction unit 10, based on the update request fb from the navigation device 2, performs processing that extracts the request update section 23 that is a section subjected to a difference update, and extracts for each request update section 23 up to the latest version of the update data file Ma to be supplied to the navigation device 2.

First, the request update data extraction unit 10, based on the update request fb from the navigation device 2, performs processing to extract the request update section 23 that is a section subject to a difference update. In at least one embodiment, the update request fb includes the update request map range 51, which is a map range for which the navigation device 2 is requesting the supply of the update data file Ma. The update request map range 51 includes a preset map range or a map range specified by the user of the navigation device 2. For example, a map range within a prescribed radial distance from a position registered as the home of the user of the navigation device 2, an administrative section range such as one, two, or more prefectures specified by the user, or a map range that includes the surroundings of the current own position detected by the own position detection device 42, the surroundings of a destination, the surroundings of a route set to a destination, or the like. Here, the map range may be a section range. In the present example, from the update request map range 51 included in the update request fb from the navigation device 2, the request update data extraction unit 10 extracts the request update section 23 that is a section p for which there exists map data such as road data subject to a difference update.

The request update data extraction unit 10 then performs processing to extract up to the latest version of the update data file Ma that is to be supplied to the navigation device 2 for each request update section 23. In some embodiments, the request update data extraction unit 10 extracts for each request update section 23 all versions of the update data file Ma that are newer than the current version managed by the management database DB2, up to the latest version stored in the update map database DB1.

The map update data supply device 1 is thus able to suppress the duplication and extraction of versions already supplied to each navigation device 2. Therefore, the volume of data and number of update data files Ma to be supplied depending on the navigation device 2 can be minimized.

More specifically, based on an identification code of the navigation device 2 such as the serial number and identification information such as the latest supply date which are included in the update request fb from the navigation device 2, the request update data extraction unit 10 specifies the management data table DT that matches the navigation device 2 that originated the update request fb, from the management data tables DT of the plurality of navigation devices 2 managed in the management database DB2. The request update data extraction unit 10 then extracts the current version of the update data file Ma already supplied to the navigation device 2 for each request update section 23 from the specified management data table DT. Next, the request update data extraction unit 10 extracts the latest version for each request update section 23 from the version table VT of the update map database DB1. The request update data extraction unit 10 subsequently extracts all versions of the difference update data file Ma that are newer than the current version in the navigation device 2, up to the latest version stored in the update map database DB1. The extracted versions become update versions of the update data to be supplied.

The identification information included in the update request fb from the navigation device 2 may not match the identification information stored in the management database DB2, and the data of the navigation device 2 that originated the update request fb may not be stored in the management database DB2. In such case, the map update data supply device 1 requests that the navigation device 2 transmit to the map update data supply device 1 the current version of the update data file Ma for the section p already supplied to the navigation device 2. Based on the data received from the navigation device 2, the request update data extraction unit 10 extracts the current version for each request update section 23 of the navigation device 2 from the update map database DB1. Note that this data exchange is performed by the communication control unit 14 and the communication device 6.

In some embodiments, data having the same format as the management data table DT stored in the management database DB2 is transmitted from the navigation device 2, and the management database update unit 9 performs processing to add the received management data table DT of the navigation device 2 to the management database DB2. Thereafter, the request update data extraction unit 10 extracts the current version managed in the management database DB2 for each request update section 23 as described above.

For a first update of the navigation device 2 or for a first update of the navigation device 2 after its data has been initialized, the navigation device 2 includes information in the update request fb that indicates the update is a first update. Consequently, the request update data extraction unit 10 does not use the information in the management database DB2 and sets the initial version (version 0) stored in the update map database DB1 for each request update section 23 as the current version. Note that after the update data is supplied, the management database update unit 9 performs processing to add the management data table DT of that particular navigation device 2 to the management database DB2.

Next, the request update data extraction unit 10 extracts for each request update section 23 all versions of the update data file Ma that are newer than the extracted current version from the update map database DB1, up to the latest version stored in the update map database DB1.

2-5-5. Safeguard Update Data Extraction Unit 11

The safeguard update data extraction unit 11 performs processing that extracts the safeguard update section 24, which is a particular section p that requires updating to safeguard a road network connection between adjacent sections p, when all the request update sections 23 are updated to the latest version; and extracts for each safeguard update section 24 the update data file Ma up to the update safeguard version uva, which is a particular version that requires updating to safeguard a road network connection.

Updating a particular safeguard update section 24 creates a need to update the section p adjacent to that safeguard update section 24 for network safeguarding, and causes the safeguard update sections 24 to spread out in a chain manner. However, in at least one embodiment, for the update of the safeguard update section 24, rather than up to the latest version of the update data file Ma, the safeguard update data extraction unit 11 extracts the update data file Ma up to the update safeguard version uva, which is a version that needs updating to safeguard the road network. Therefore, the update safeguard version uva of each section p becomes increasingly older than the latest version the farther the section p is from the request update section range 22, and the section range in which the safeguard update sections 24 spread out in a chain manner can thus be narrowed.

In an embodiment, based on the safeguard version table SVT, the request update section 23, and the latest version of the request update section 23, the safeguard update data extraction unit 11 extracts the safeguard update section 24, extracts the update safeguard version uva for each safeguard update section 24, and extracts up to the update safeguard version uva of the update data file Ma.

More specifically, in at least one embodiment, an adjacent section group is the section group g that is formed of: the extraction update section 31, which is an update section extracted by the request update data extraction unit 10 or the safeguard update data extraction unit 11; and an adjacent section 26, which is the section p that is adjacent to that particular extraction update section 31. The safeguard version table SVT is searched for the adjacent section group. The adjacent section group is extracted if there are any safeguard versions va of the extraction update section 31 of the adjacent section group that are newer than the current version and respectively match versions up to a post-update version (the latest version of the request update section 23, or the newest update safeguard version uva of the safeguard update section 24). The adjacent section 26 of the extracted adjacent section group is then extracted as the safeguard update section 24. The safeguard version va of the adjacent section 26 that corresponds as a safeguard version group to the latest safeguard version va among the matching safeguard versions va of the extraction update section 31 is extracted as the update safeguard version uva of the extracted safeguard update section 24.

Here, the current version of the section p is extracted from the management data table DT of the navigation device 2, and the latest version of the section p is extracted from the version table VT.

It should also be noted that the post-update version is the newest version among the versions of the update data file supplied for the section p.

Processing is subsequently performed that sets a newly extracted safeguard update section 24, and an already extracted safeguard update section 24 from which a newer update safeguard version uva is extracted as extraction update sections 31 that are extracted update sections. The newest safeguard version uva of each extraction update section 31 is set as the post-update version. As described above, an adjacent section group is extracted again, and the safeguard update section 24 and the update safeguard version uva are extracted. This recursive extraction processing is repeatedly executed until no newer update safeguard versions uva are extracted from the new safeguard update section 24 and the already extracted safeguard update section 24, and the safeguard update sections 24 spreading out in a chain manner and the update safeguard versions uva thereof are extracted. Processing is next performed that, for the safeguard update section 24 for which a plurality of update safeguard versions uva is extracted, sets the newest update safeguard version uva as the final update safeguard version uva of that particular safeguard update section 24, and extracts the update data file.

Note that the processing that extracts the safeguard update section 24 and the update safeguard version uva thereof is not limited to processing in which the request update section 23 is set as the extraction update section 31, and may be used in more general processing that extracts the safeguard update section 24 and the update safeguard version uva to safeguard a surrounding network of a prescribed section p to be updated to a prescribed version, which is set as the extraction update section 31.

According to such processing, the current and older safeguard versions va are already supplied and the network safeguarded. Because there is no need to update for network safeguarding, the update safeguard version uva newer than the current version is extracted. In addition, the update safeguard version uva is extracted based on the latest safeguard version va out of the safeguard versions va respectively matching all versions up to the newest version (post-update version) among the supplied versions. Accordingly, if the request update section 23 is updated to the latest version, the update safeguard version uva is set as a version that needs updating to safeguard a road network connection between adjacent sections. Because the adjacent section 26, for which such an update safeguard version uva exists, is extracted as the safeguard update section 24, if the request update section 23 is updated to the latest version, the safeguard update section 24 becomes a section that needs updating to safeguard a road network connection between adjacent sections.

In some embodiments, first, the request update section 23 that is an update section extracted by the request update data extraction unit 10 is set as the extraction update section 31. An adjacent section group is extracted that is the section group g formed of the extraction update section 31 and the section p, which is adjacent to the extraction update section 31 and not a separate request update section 23. Accordingly, an end request update section 25, which is at least one request update section 23 positioned at an end of the request update section range 22, is set as the extraction update section 31. The adjacent section 26 is the section p that is not a request update section 23, and is adjacent to the end request update section 25. The section group g is formed of the extraction update section 31 and the adjacent section 26, and is extracted as an adjacent section group. The safeguard version table SVT is searched for the adjacent section group. The adjacent section 26 of the adjacent section group is extracted as the safeguard update section 24 if there are any safeguard versions va of the extraction update section 31 of the adjacent section group that are newer than the current version and respectively match versions up to the latest version. The safeguard version va of the adjacent section 26 that corresponds as a safeguard version group to the latest safeguard version va among the matching safeguard versions va of the extraction update section 31 is extracted as the update safeguard version uva of the extracted safeguard update section 24.

In the example shown in FIG. 9A, the section A1 is set as the end request update section 25 and the extraction update section 31 of the request update section 23. The section A2 is extracted as the adjacent section 26. The section group g formed of the section A1 and the section A2 is extracted as an adjacent section group. Here, as shown in FIG. 9B, the current versions of the sections A1, A2, A3, and A4 are 1, 1, 2, and 2, respectively, and the latest versions are 8, 6, 6, and 5, respectively. The safeguard version table SVT shown in FIG. 9C is searched for the adjacent section group formed of the section A1 and the section A2. A determination is made regarding whether there are any safeguard versions va of the section A1, which is the extraction update section 31 of the adjacent section group, that are newer than the current version 1 and respectively match versions 2 to 8 up to the latest version 8. As shown in FIG. 9C, the safeguard versions for the section A1 are 1, 3, 5, and 7. The versions 3, 5, and 7 match. Therefore, the section A2 that is the adjacent section 26 of the adjacent section group is extracted as the safeguard update section 24. The safeguard version va of 5 of the adjacent section 26 that corresponds as a safeguard version group to the latest safeguard version va of 7 among the matching safeguard versions va of 3, 5, and 7 of the extraction update section 31, i.e., section A1, is extracted as the update safeguard version uva of the safeguard update section 24. In other words, the section A2 is extracted as the safeguard update section 24. and the update safeguard version uva of the section A2 is 5.

Updating the safeguard update section 24 extracted from the adjacent section 26 up to the update safeguard version uva creates a need to also update the section p adjacent to this safeguard update section 24 for network safeguarding, and causes the safeguard update sections 24 to spread out in a chain manner. The safeguard update data extraction unit 11 extracts the safeguard update sections 24 spreading out in a chain manner, and also extracts the update safeguard version uva of each safeguard update section 24.

For this reason, next, the extracted safeguard update section 24 is set as the extraction update section 31, which is an extracted update section. The section p adjacent to that particular update section 31 is extracted as the adjacent section 26. The section g formed of the extraction update section 31 and the adjacent section 26 is extracted as an adjacent section group. The safeguard version table SVT is searched for the adjacent section group. The adjacent section 26 of the adjacent section group is extracted as the safeguard update section 24 if there are any safeguard versions va of the extraction update section 31 that are newer than the current version and respectively match versions up to the update safeguard version uva. The safeguard version va of the adjacent section 26 that corresponds as a safeguard version group to the latest safeguard version va among the matching safeguard versions va of the extraction update section 31 is extracted as the update safeguard version uva of the extracted safeguard update section 24.

Processing is performed that sets a newly extracted safeguard update section 24, and an already extracted safeguard update section 24 from which a newer update safeguard version uva is extracted as extraction update sections 31 that are extracted update sections. Adjacent section groups thereof are then extracted, and the safeguard update section 24 and the update safeguard version uva are similarly extracted. Such processing is repeated until no newer update safeguard versions uva are extracted from the new safeguard update section 24 and the already extracted safeguard update section 24, and the safeguard update sections 24 spreading out in a chain manner and the update safeguard versions uva thereof are extracted.

Thus, using as a basis the safeguard version va that matches versions up to the update safeguard version uva of an extraction safeguard update section, i.e., the extracted safeguard update section 24, the safeguard update data extraction unit 11 extracts the update safeguard version uva of the safeguard update section 24 adjacent to the extraction safeguard update section and extracted in a chain manner. Therefore, the safeguard version va used as a basis becomes at least older than the update safeguard version uva of the extraction safeguard update section. Consequently, the update safeguard version uva extracted in a chain manner becomes increasingly older than the latest version the farther the section p is from the request update section range 22, and the section range in which the safeguard update sections 24 spread out in a chain manner can thus be narrowed.

Alternatively, using as a basis the safeguard version va that matches a version newer than the current version, the safeguard update data extraction unit 11 extracts the update safeguard version uva of the safeguard update section 24 adjacent to the extraction safeguard update section and extracted in a chain manner. Therefore, the safeguard version va used as a basis becomes at least newer than the current version of the extraction safeguard update section. Consequently, the update safeguard version uva extracted in a chain manner is limited to a version newer than the current version, and the section range in which the safeguard update sections 24 spread out in a chain manner can thus be narrowed.

In the example shown in FIG. 9A, the section A2 that is the extracted safeguard update section 24 is set as the extraction update section 31. The section A3 is extracted as the adjacent section 26. The section group g formed of the section A2 and the section A3 is extracted as an adjacent section group. The safeguard version table SVT shown in FIG. 9C is searched for the adjacent section group formed of the section A2 and the section A3. A determination is made regarding whether there are any safeguard versions va of the section A2, which is the extraction update section 31 of the adjacent section group, that are newer than the current version 1 and respectively match versions 2 to 5 up to 5, which is the update safeguard version uva of the section A2. As shown in FIG. 9C, the safeguard versions for the section A2 are 1, 4, and 6. The version 4 matches. Therefore, the section A3 that is the adjacent section 26 of the adjacent section group is extracted as the safeguard update section 24. Given the matching safeguard version va of 4, the safeguard version va of 3 of the adjacent section 26 that corresponds as a safeguard version group to the latest safeguard version va of 4 of the extraction update section 31 is extracted as the update safeguard version uva of the safeguard update section 24. In other words, the section A3 is extracted as the safeguard update section 24, and the update safeguard version uva of the section A3 is 3.

Next, the section A3, which is the extracted safeguard update section 24, is set as the extraction update section 31. The section A4 is extracted as the adjacent section 26. The section g formed of the section A3 and the section A4 is extracted as an adjacent section group, and similarly, the safeguard update section 24 and the update safeguard version uva are extracted. In other words, the safeguard version table SVT shown in FIG. 9C is searched for the adjacent section group formed of the section A3 and the section A4. A determination is made regarding whether there are any safeguard versions va of the section A3, which is the extraction update section 31 of the adjacent section group, that are newer than the current version 2 and respectively match versions up to 3, which is the update safeguard version uva of the section A3. As shown in FIG. 9C, the safeguard versions for the section A3 are 2, 4, and 5. No version matches, and therefore, the safeguard update section 24 is not extracted. In the example shown in FIG. 9A, there are no other adjacent section groups, so the processing to extract the safeguard update section 24 and the update safeguard version uva is ended.

Accordingly, in the example shown in FIGS. 9A to 9C, the sections A2 and A3 are extracted as safeguard update sections 24, and the update safeguard versions uva of 5 and 3 are respectively extracted. As shown in FIGS. 9A to 9C and FIG. 10, the update safeguard version uva of each section p becomes increasingly older than the latest version the farther the section p is from the request update section range 22. In addition, the update safeguard version uva of each section p is limited to a version newer than the current version, so the section range in which the safeguard update sections 24 spread out in a chain manner can be narrowed.

Meanwhile, in the case where the adjacent section 26 of the adjacent section group is extracted as the safeguard update section 24 if there are any safeguard versions va that match all versions up to the latest version, rather than up to the post-update version, the section A4 in the example shown in FIGS. 9A to 9C and FIG. 10 is also set as the safeguard update section 24, and the section range in which the safeguard update sections 24 spread out in a chain manner becomes broader.

Further, according to some embodiments, the safeguard update data extraction unit 11 extracts all versions of the update data file Ma that are newer than the current version up to the update safeguard version uva for each safeguard update section 24.

The map update data supply device 1 is thus able to suppress the duplication and extraction of versions already supplied to each navigation device 2. Therefore, the volume of data and number of update data files Ma to be supplied depending on the navigation device 2 can be minimized.

2-5-6. Integrated Data Generation Unit 12

The integrated data generation unit 12 performs processing that integrates per request update section 23 all versions up to the latest version of the update data file Ma for each request update section 23 extracted by the request update data extraction unit 10, and generates a request update integrated data file 33 that serves as a data file for one difference update. In addition, the integrated data generation unit 12 performs processing that integrates per safeguard update section 24 the versions up to the update safeguard version uva of the update data file Ma for each safeguard update section 24 extracted by the safeguard update data extraction unit 11, and generates a safeguard update integrated data file 34 that serves as a data file for one difference update.

In other words, for each request update section 23 and safeguard update section 24, a plurality of versions of the update data file Ma for difference updating up to the latest version or the update safeguard version uva is integrated per section p, and a data file for one difference update is generated and supplied to the navigation device 2. Thus, compared to supplying a plurality of versions of the update data file Ma unchanged, the volume of data and the number of data files to be supplied can be reduced.

More specifically, in some embodiments, the integrated data generation unit 12 targets all versions of the update data file Ma extracted for the section p. For example, the integrated data generation unit 12 integrates a plurality of versions of update data, wherein a data unit DU that did not exist before an update is added and ultimately deleted, such that an update of that particular data unit DU is not performed (an integration pattern for no integrated data). In addition, a plurality of versions of update data, wherein the content of a data unit DU that existed before an update is modified and ultimately deleted, is integrated as one piece of data for performing an update that deletes that particular data unit DU (an integration pattern for deletion). A plurality of versions of update data, wherein a data unit DU that did not exist before an update is added and has its content modified, is integrated as one piece of data for performing an update that adds that particular data unit DU (an integration pattern for addition). A plurality of versions of update data, wherein a data unit DU that existed before an update is ultimately modified, is integrated as one piece of modification update data (an integration pattern for modification).

A specific integration process of update data is described below.

In an embodiment, the integrated data generation unit 12 performs processing that extracts all the update sections, that is, all the request update sections 23 and safeguard update sections 24; and generates per extracted update section the request update integrated data file 33 and the safeguard update integrated data file 34, which are data files for performing one difference update and which integrate all versions of the update data file Ma to be supplied. This integration processing extracts per update section all identification codes that exist for all update versions of the update data file Ma to be supplied, and extracts per extracted identification code all existing update versions of update data. The integrated data generation unit 12 then performs processing that determines the integration pattern of all update data for each identification code, in consideration of the significance of an update history that spans all update versions and is a history of addition, modification, and deletion update content; and integrates all update data for the identification code as one piece of any one of addition, modification, and deletion update data, or as without update data. For each update section, the integrated data generation unit 12 generates one difference update data file of the post-integration update data generated for each identification code, which serves as the integrated data file fa for the update section.

Next, the specific processes of integration pattern determination processing and integrated data generation processing based on an addition, modification, and deletion update history per identification code will be described.

Referring to Cases 1 to 3 of FIGS. 11 and 12, among all the update data that exists for each identification code, the first update content that is the update content of the oldest version of update data is an addition; and the last update content that is the update content of the newest version of update data is a deletion. In such case, as described above, the plurality of versions of update data add a data unit DU that did not exist before an update and ultimately delete the data unit DU. Processing is thus performed to integrate the plurality of versions of update data such that the data unit DU of that particular identification code is not updated (the integration pattern for no integrated data). In other words, for that identification code, none of the plurality of versions of update data are added to the integrated data file.

Meanwhile, referring to Cases 4 and 5 of FIG. 12, the first update content is a modification and the last update content is a deletion for each identification code. In such case, as described above, the plurality of versions of update data modify the content of a data unit DU that existed before an update and ultimately delete the data unit DU. Processing is thus performed that integrates the plurality of versions of update data as one piece of deletion update data for performing an update that deletes that particular data unit DU (an integration pattern for deletion). In some embodiments, processing is performed to generate deletion update data for only that particular identification code.

Referring to Cases 9 and 10 of FIG. 12, the first update content is an addition and the last update content is a modification for each identification code. In such cases, as described above, the plurality of versions of update data add a data unit DU that did not exist before an update and modify its content. Processing is thus performed that integrates the plurality of versions of update data as one piece of addition update data for performing an update that adds that particular data unit DU (an integration pattern for addition). In some embodiments, processing is performed that subjects the first addition update data, which includes the attribute data of all data items required for constituting one data unit DU, to difference updates using each version of update data in the order of older version first, starting from the second oldest version of update data among the respective update data that exists for each identification code up to the newest version of update data; and generates addition update data that is the integrated update data after such difference updating of the update data. Such difference updating is executed by updating the pre-update data of each data item that pertains to a modification of the update data to the post-update data. In the present example, only a data item for which there is an update is difference updated using the update yes/no flag data included in the modification update data. Using the update yes/no flag shortens the generation time of the integrated update data.

In the road data example, regardless of whether there is a modification of each data item, the modification update data includes the data of all data items with a potential to be updated, except for the start point intersection ID and the end point intersection ID. Therefore, the difference updating described above is not performed, and the integrated addition update data is generated using the data of all data items except for the intersection IDs in the last update data. In other words, processing is performed to generate addition update data that is constituted from the identification code; the start point intersection ID and the end point intersection ID included in the first update data that is addition update data; and all data items except for the intersection IDs of the last update data that is modification update data. There is no need to perform a difference update for each data item, so the generation time of the integrated update data can be shortened. Furthermore, in some embodiments, a modification of the road data that changes the start point intersection ID or the end point intersection ID becomes a deletion and addition of the road data with the changed identification code. Therefore, the intersection IDs of all update data for each identification code are not modified and remain uniform. Accordingly, there is no need to search all update data for each identification code and extract the intersection ID, and the start point intersection ID and the end point intersection ID included in the addition update data that is the first update data is used in the integrated update data. Therefore, the generation time of the integrated update data can be shortened.

Referring to Case 8 of FIG. 12, the first update content is a modification and the last update content is a modification for the identification code. In such case, as described above, the plurality of versions of update data ultimately modify a data unit DU that existed before an update. Processing is thus performed that integrates the plurality of versions of update data as one piece of modification update data for performing an update that modifies that particular data unit DU (an integration pattern for modification).

In at least one embodiment, processing is performed that subjects the first modification update data to difference updates using each version of update data in the order of older version first, starting from the second oldest version of update data among the respective update data that exists for each identification code up to the newest version of update data; and generates modification update data that is the integrated update data after such difference updating of the update data. Such difference updating is executed by updating the pre-update data of each data item that pertains to a modification of the update data to the post-update data. If no pre-update data exists for a data item subject to a modification, data for the post-modification data item is added and updated.

In some embodiments, only a data item for which there is an update is difference updated using the update yes/no flag data included in the modification update data. Using the update yes/no flag shortens the generation time of the integrated update data.

In the road data example, as described above, the modification update data, regardless of whether there is a modification of each data item, includes the data of all data items with a potential to be updated, except for the start point intersection ID and the end point intersection ID. Therefore, the difference updating described above is not performed, and the integrated modification update data is generated using the data of all data items except for the intersection IDs in the last update data. With regard to the update yes/no flag, an update yes/no flag that is the product of searching per data item the update yes/no flags of all update data for each identification code and setting data items with at least one update as having an update (ORing (merging) all flags for each data item with respect to having an update) is used as an integrated modification update flag. Note that when there are deletions and additions (when there is update data without an update yes/no flag) in versions between the first and last versions of update data, an update yes/no flag that indicates all data items as having an update is used in the integrated update data. In the case of such additions and deletions as well, as described above, the start point intersection ID and the end point intersection ID are not modified. Therefore, the intersection IDs can be excluded from the integrated update data and the modification update data used.

In other words, processing is performed to generate modification update data that is constituted from the identification code; all data items except for the intersection IDs of the last update data that is the modification update data; and the merged update yes/no flag. There is no need to perform a difference update for each data item, so the generation time of the integrated update data can be shortened. In addition, the processing load for flag merging is considerably smaller than that for difference updating the data of each data item.

Thus, the integration pattern can be determined by simply determining the first and last update content of all update data for the identification code, which reduces the integration processing computation load. Similar to the road data, the modification update data includes the data of all data items with a potential to be updated. There is thus no need to perform a difference update of all versions of the update data to generate the integrated update data. Accordingly, the last update data can be set unchanged as the data of the integrated update data, thus reducing the integration processing computation load and shortening the update data supply time.

The update data stored in the update database DB1 that is pre-integration update data is constituted so as to include the data of all data items with a potential to be updated. Conversion processing is performed so that the integrated update data format includes the data of only the data items to be updated instead of all data items. An integrated data file may be constituted from the post-conversion processing update data and supplied to the navigation device 2. During such conversion processing, the update yes/no flag can be used to extract the data items to be updated, so the conversion processing computation load can be kept low. With such a configuration, there is no need for difference updating as described above in the integration processing performed within the map update data supply device 1. Therefore, the integration processing computation load can be reduced and the update data supply time shortened. Meanwhile, the volume of update data to be supplied can be decreased, and a reduction in the distribution time and communication cost can also be achieved.

Next, using the examples shown in FIGS. 11 and 12, a reduction effect on the supply data size that is achieved by integrating the plurality of versions of update data for a particular identification code will be described. Here, especially crucial road data is used as an example in the following description.

FIG. 11 depicts a reduction in the supply data size that is achieved by integration processing, based on an integration pattern (integration pattern for no integrated data) that integrates a plurality of versions of update data, wherein a data unit DU of a particular identification code that did not exist before an update is added and ultimately deleted, such that an update of that particular data unit DU is not performed. In the example of FIG. 11, the map data Mb in the navigation device 2 before an update is initial data, and the data unit DU of the road data with an identification code 10 (ID: 10) does not exist. After the map update data supply device 1 receives the update request fb from the navigation device 2, the map update data supply device 1 extracts versions 1 to 3 of addition, modification, and deletion update data for the identification code 10, and supplies all extracted update data information to the navigation device 2.

The respective data sizes of the addition, modification, and deletion update data, which are respective update versions of update data, are 24, 16, and 4 bytes, as mentioned earlier. If integration processing according to some embodiments is not performed, it is necessary to transmit each update version of all the update data. The transmission data has a total data size of 44 bytes, and constitutes update data for three difference updates. However, if in some embodiments integration processing is performed, the update data for the identification code 10 is ultimately deleted after being added. Therefore, no update is performed. In other words, the plurality of versions of update data is integrated such that no update is performed, i.e., there is no update data. As a consequence, there is no update data to be transmitted and the data size is 0 bytes. Accordingly, integration processing achieves a considerable reduction in the volume of transmission data and the number of times difference update processing is performed in the navigation device 2.

supply data size that is achieved with each integration pattern will be described.

FIG. 12 shows, in a case where versions 1 to 4 are extracted as update versions, a history of update content for versions 1 to 4 of update data for a particular identification code, wherein examples of the update history that correspond to each integration pattern are shown in Cases 1 to 10. Specific update content is set per version as examples of combinations, wherein a circle (O) indicates that an update of that particular update content is performed, and a dash (—) indicates that an update of all update content including that particular update content is not performed. Here, the update content of version 1 is an addition, version 2 is a modification, version 3 is a modification, and version 4 is a deletion.

Cases 1 to 3 illustrate the integration pattern (integration pattern for no integrated data) shown in FIG. 11 that integrates a plurality of versions of update data, wherein a data unit DU for a particular identification code that did not exist before an update is added and ultimately deleted, such that there is no update data. Cases 4 and 5 illustrate the integration pattern (integration pattern for deletion) that integrates a plurality of versions of update data, wherein a data unit DU for a particular identification code that existed before an update is modified and ultimately deleted, as one piece of deletion update data. Case 8 illustrates the integration pattern (integration pattern for modification) that integrates a plurality of versions of update data, wherein a data unit DU for a particular identification code that existed before an update is ultimately modified, as one piece of modification update data. Cases 9 and 10 illustrate the integration pattern (integration pattern for addition) shown in FIG. 11 that integrates a plurality of versions of update data, wherein a data unit DU for a particular identification code that did not exist before an update is added and ultimately modified, as one piece of addition update data. Note that, for comparison purposes, Cases 6, 7, and 11 only have one version of deletion, modification, and addition update data, respectively, and illustrate examples where integration is not necessary. In such cases, there is obviously no reduction effect on the supply data size.

The right half of the table in FIG. 12 shows the effect achieved based on whether integration processing is performed for each case. The right half of the table shows, in the case of no integration processing, the number of updates (quantity of update data to be supplied), i.e., the number of times processing for required difference updates is performed in the navigation device 2, and also shows the total data size of the update data to be supplied. In the case of integration processing, the update content of the one piece of update data to be generated, the number of updates, and the total data size is shown.

As shown in FIG. 12, performing integration processing achieves a considerable reduction in the number of updates (quantity of update data) and the total data size over all integration patterns. In addition, as evidenced by Cases 2, 5, and 10, a larger number of versions to be integrated results in a greater reduction effect. Accordingly, integration processing achieves a considerable reduction in the volume of transmission data and the number of times difference update processing is performed in the navigation device 2.

Next, an outline of an operation and effect of the present embodiment will be given using the examples shown in FIGS. 13A and 13B.

FIG. 13A shows extracted update data files Ma before integration processing is performed (in the case of no integration). FIG. 13B shows integrated data files after integration processing is performed in the example of FIG. 13A.

In the example of FIG. 13A, for each request update section 23 of the request update section range 22 extracted based on the update request fb, all versions up to the latest version of the update data file Ma, which are newer than the already supplied update data file, are extracted as an update data file to be supplied. For each surrounding safeguard update section 24 of the safeguard update section range to be updated for network safeguarding, all versions up to the update safeguard version uva of the update data file Ma, which are newer than the already supplied update data file, are extracted as an update data file to be supplied. At such time, to update the safeguard update section 24, the update data file Ma up to the update safeguard version uva that needs updating to safeguard the road network is extracted and used to update instead of up to the latest version of the update data file. Therefore, the update safeguard version uva becomes increasingly older than the latest version the farther the section is from the request update section range, and the section range in which the safeguard update sections 24 spread out in a chain manner can thus be narrowed. Consequently, the number of versions of the update data file Ma for the safeguard update sections 24 and the safeguard update section ranges can be kept to a minimum. In addition, the volume of update data for network safeguarding can be suppressed.

Thus, up to the latest version of update data for the request update section 23 requested by the navigation device 2 is supplied; and for around the request update section 23, the minimum section range and version of update data that enables safeguarding of the road network is supplied, which improves the convenience and reliability of the navigation device 2. Further, the number of data files and volume of data supplied to the navigation device 2 can be reduced.

The plurality of versions of update data files Ma shown in FIG. 13A that is extracted per section p is integrated into one integrated data file. For integration, as described above, all update data for the identification code is integrated as one piece of any one of addition, modification, and deletion update data in consideration of the significance of an update history of additions, modifications, and deletions. Accordingly, the number of data files and volume of data supplied to the navigation device 2 can be reduced. As shown in FIG. 13B, the plurality of versions of update data files shown in FIG. 13A for each update section before integration processing can be considerably reduced into one integrated data file through integration processing.

Therefore, the distribution time and communication cost when distributing data from the map update data supply device 1 to the navigation device 2 can be reduced, and the update time of the map database DB3 in the navigation device 2 can also be reduced, thus improving the convenience of map updating in the navigation device 2.

2-5-7. Communication Control Unit 14

The communication control unit 14 performs an operation control of the communication device 6. Specifically, the communication control unit 14 controls communication between the navigation device 2 and the map update data supply device 1 using the communication device 6, and causes the communication device 6 to perform operations for receiving the data of the update request fb transmitted from the navigation device 2, transmitting the integrated data file fa constituted from request update integrated data file 33 and the safeguard update integrated data file 34 to the navigation device 2, and the like. Thus, in some embodiments, the communication control unit 14 and the communication device 6 constitute the integrated data supply unit 13 that supplies the integrated data file fa to the navigation device 2.

3. Operation Processing of Map Update Data Supply Device 1

Next, the processing of the map update data supply device 1 that operates in accordance with the map update data supply program will be described based on flowcharts. The following processing performed by the units 7 to 14 provided in the map update data supply device 1 will be explained: processing that generates and supplies the integrated data file fa in response to a map database DB3 update request from the navigation device 2; and during such processing, processing that extracts request update data, processing that extracts safeguard update data, processing that generates integrated data from such update data, and processing that updates various databases.

3-1. Integrated Data File fa Generation/Transmission Processing

FIG. 15 is a flowchart that shows processing performed by the map update data supply device 1 to generate and supply the integrated data file fa. As shown in FIG. 15, if there is an update request from the navigation device 2, that is, if the map update data supply device 1 receives the update request fb (#11:Yes), the request update data extraction unit 10 performs processing to extract the request update section 23 based on the update request fb, and up to the latest version of the update data file Ma for the request update section 23 (#12).

The processing at #12 extracts the request update section 23 based on the update request fb from the navigation device 2, and extracts for each request update section 23 up to the latest version of the update data file Ma to be supplied to the navigation device 2. This processing will be described in more detail later based on a flowchart in FIG. 16.

Next, the map update data supply device 1 uses the safeguard update data extraction unit 11 to perform processing that extracts the safeguard update section 24 and the update safeguard version uva of the safeguard update section 24; and extracts up to the update safeguard version uva of the update data file Ma for the safeguard update section 24 (#13).

The processing at #13 extracts the safeguard update section 24, which is a particular section p that needs updating to safeguard a road network connection between adjacent sections p, when all the request update sections 23 are updated to the latest version; and extracts for each safeguard update section 24 the update data file Ma up to the update safeguard version uva, which is a particular version that needs updating to safeguard a road network connection. This processing will be described in more detail later based on a flowchart in FIG. 17.

The map update data supply device 1 subsequently uses the integrated data generation unit 12 to perform processing that generates the request update integrated data file 33 and the safeguard update integrated data file 34 (#14).

The processing integrates per request update section 23 all versions up to the latest version of the update data file Ma for each request update section 23 extracted by the request update data extraction unit 10, and generates the request update integrated data file 33 that serves as a data file for one difference update; and integrates per safeguard update section 24 the versions up to the update safeguard version uva of the update data file Ma for each safeguard update section 24 extracted by the safeguard update data extraction unit 11, and generates the safeguard update integrated data file 34 that serves as a data file for one difference update. This processing will be described in more detail later based on flowcharts in FIGS. 18 and 19.

Next, the map update data supply device 1 uses the communication control unit 14 and the communication device 6 that constitute the integrated data supply unit 13 to perform processing that supplies the request update integrated data file 33 and the safeguard update integrated data file 34 to the navigation device 2 (#15). Thus, as described above, the integrated data file fa is supplied to the navigation device 2.

FIG. 16 is a flowchart that shows the processing performed by the request update data extraction unit 10 at #12, wherein based on the update request fb, the request update section 23 and up to the latest version of the update data file Ma for the request update section 23 are extracted.

First, as described above, the request update data extraction unit 10 performs processing to determine whether the update is a first update based on the update request fb from the navigation device 2 (#21). If not a first update (#21: No), the management database DB2 is searched for the management data table DT that matches the navigation device 2 that originated the update request fb, as described above (#22). If there is a matching management data table DT (#23: Yes), the current version of the request update section 23 is extracted from the management data table DT specified in the search.

The request update data extraction unit 10 subsequently performs processing to extract all versions of the update data file Ma that are newer than the current version for the request update section 23, up to the latest version stored in the update map database DB1 (#24).

However, if the update is a first update (#21: Yes), the current version is set as the initial version (version 0) at #24, and the processing at #24 is performed to extract the update data file Ma.

In addition, if there is no matching management data table DT (#23: No), as described above, the map update data supply device 1 performs processing to request that the navigation device 2 that originated the update request fb transmit the current version already supplied to the navigation device 2 (#25). If the current version data is received from the navigation device 2 (#26: Yes), the processing at #24 is performed to extract the update data file Ma, based on the received current version.

3-3. Processing Performed by Safeguard Update Data Extraction Unit 11

Figure 17:
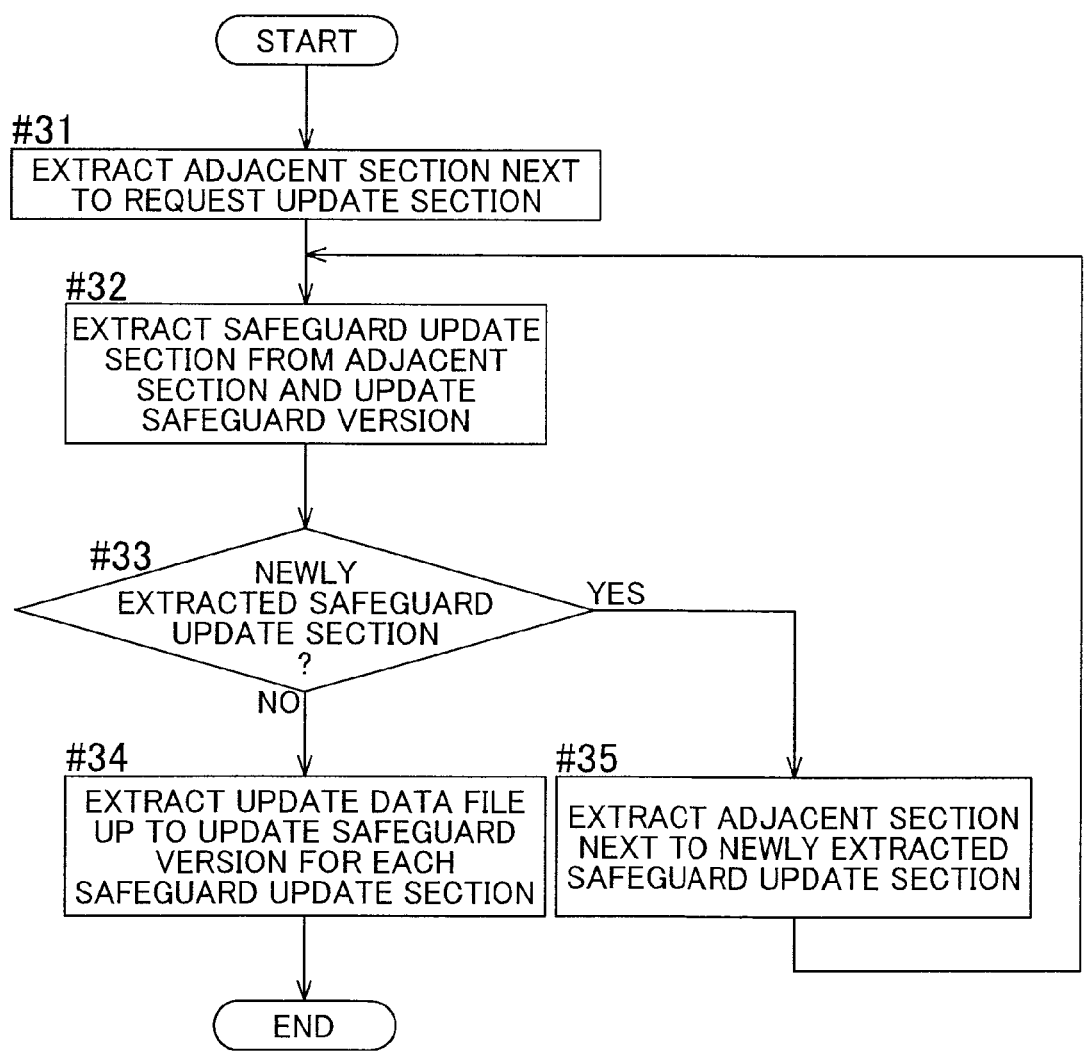
FIG. 17 is a flowchart that shows processing performed by a safeguard update data extraction unit.

FIG. 17 is a flowchart that shows the processing performed by the safeguard update data extraction unit 11 at #13, wherein the safeguard update section 24 and the update safeguard version uva of the safeguard update section 24 are extracted, and up to the update safeguard version uva of the update data file Ma for the safeguard update section 24 is extracted.

First, as described above, the safeguard update data extraction unit 11 performs processing to extract the adjacent section 26 next to the request update section range 22, which is a section range of the request update sections 23, and also extracts an adjacent section group thereof (#31).

The safeguard update data extraction unit 11 subsequently performs processing to extract the safeguard update section 24 from the adjacent section 26 by searching for the extracted adjacent section group in the safeguard version table SVT based on the post-update version, as described above; and extract the update safeguard version uva for each safeguard update section 24 (#32).

If a new safeguard update section 24 is extracted at #32 (#33: Yes), as described above, processing is performed to extract the adjacent section 26 next to the newly extracted safeguard update section 24, and the adjacent section group thereof (#35). At #32 again, processing is performed to extract the safeguard update section 24 from the adjacent section 26 by searching for the adjacent section group in the safeguard version table SVT based on the post-update version; and extract the update safeguard version uva for each safeguard update section 24. This recursive processing is repeatedly executed until no new safeguard update sections 24 and update safeguard versions uva are extracted, so that the safeguard update sections 24 spreading out in a chain manner and the update safeguard versions uva thereof are extracted.

If there are no longer any new safeguard update sections 24 or update safeguard versions uva to be extracted as described above (#33: No), processing is performed to extract up to the update safeguard version uva of the update data file Ma for the safeguard update section 24 (#34).

3-4. Processing Performed by Integrated Data Generation Unit 12

Figure 18:
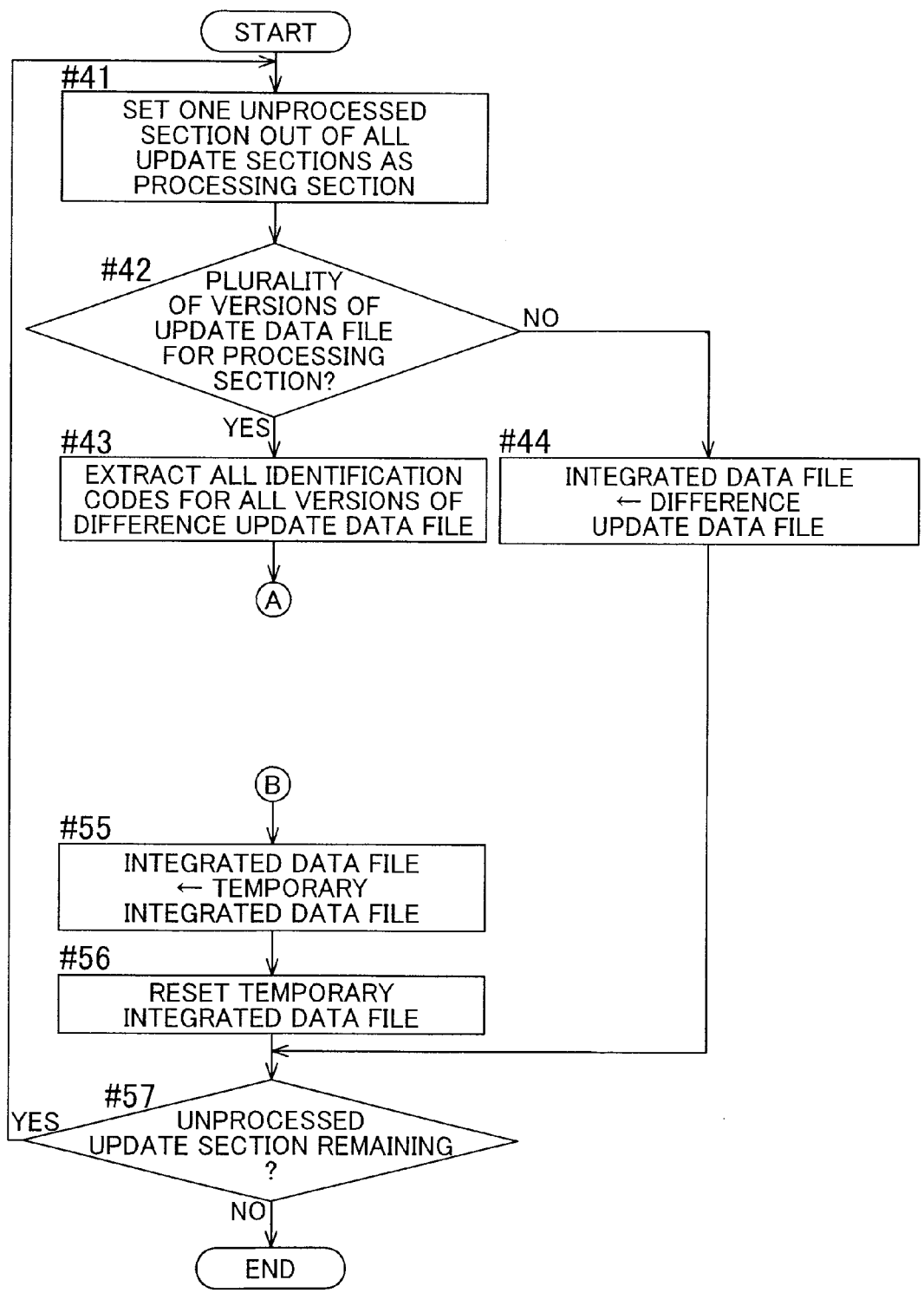
FIG. 18 is a flowchart that shows processing performed by an integrated data generation unit.
Figure 19:
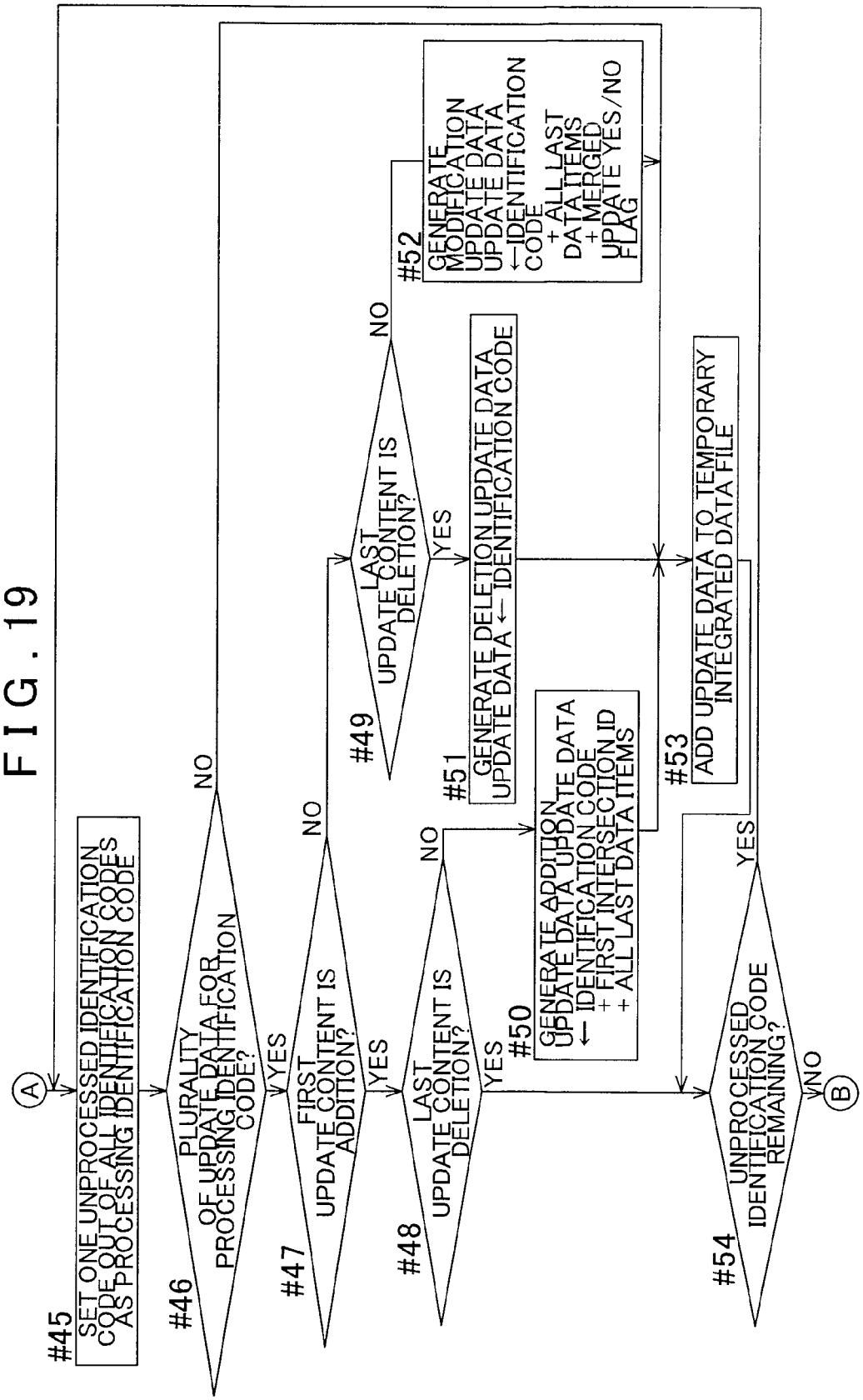
FIG. 19 is a flowchart that shows processing performed by the integrated data generation unit.

FIGS. 18 and 19 are flowcharts that show processing performed by the integrated data generation unit 12 at #14 to generate the request update integrated data file 33 and the safeguard update integrated data file 34.

In these flowcharts, consideration is given to the significance of an update history that spans a plurality of versions of update data for performing additions, modifications, and deletions with respect to each data unit DU associated with an identification code in the present embodiment. Processing that integrates update data as one piece of any one of addition, modification and deletion update data, or as without update data will be described based on these flowcharts.

First, as described above, the integrated data generation unit 12 performs processing to set one update section out of all the request update sections 23 and safeguard update sections 24, which are update sections, as a processing section (#41).

If a plurality of versions of the update data file Ma exists for the set processing section (#42: Yes), processing is performed to extract all identification codes for which all update versions of the update data file Ma exist (#43).

Processing is then performed to set one identification code out of all the extracted identification codes as a processing identification code (#45). If update data for the set processing identification code exists throughout all update versions of the update data file Ma (#46: Yes), processing is performed to integrate the update data as described below (#47 to #52).

Among all the update data that exists for the processing identification code, if the first update content that is the update content of the oldest version of update data is an addition (#47: Yes), and the last update content that is the update content of the newest version of update data is a deletion (#48: Yes), the plurality of versions of update data add a data unit DU that did not exist before an update and ultimately delete the data unit DU, as described above. In such case, the update data is integrated such that the data unit DU of that particular identification code is not updated. In other words, none of the plurality of versions of update data for the processing identification code are added to a temporary integrated data file, which will ultimately become an integrated data file for the processing section, and the integration processing is ended.

If the first update content for the processing identification code is a modification (#47: No) and the last update content is a deletion (#51: No), the plurality of versions of update data modify the content of a data unit DU that existed before an update and ultimately delete the data unit DU, as described above. In such case, processing is performed that integrates the update data as one piece of deletion update data for performing an update that deletes that particular data unit DU (#51). In the present embodiment, processing is performed to generate deletion update data for only the processing identification code.

If the first update content for the processing identification code is an addition (#47: Yes) and the last update content is a modification (#48: No), the plurality of versions of update data add a data unit DU that did not exist before an update and modify its content, as described above. In such case, processing is performed that integrates the update data as one piece of addition update data for performing an update that adds that particular data unit DU (#50). In the road data example of the present embodiment, as described above, processing is performed to generate addition update data that is constituted from the processing identification code; the start point intersection ID and the end point intersection ID included in the first update data that is addition update data; and all data items except for the intersection IDs of the last update data that is modification update data (#50).

If the first update content for the processing identification code is a modification (#47: No) and the last update content is a modification (#49: No), processing is performed that integrates the update data as one piece of modification update data for performing an update that modifies that particular data unit DU (#52). In the road data example of the present embodiment, as described above, processing is performed to generate modification update data that is constituted from the processing identification code; all data items except for the intersection IDs of the last update data that is the modification update data; and the merged update yes/no flag (#52).

Processing is then performed that adds the update data from the integration processing described above to a temporary integrated data file that will ultimately become the integrated data file for the processing section (#53).

However, if there is not a plurality of versions and only one version of the update data exists for the processing identification code (#46: No), the integration processing described above is not performed, and instead processing is performed that adds the one version of update data to the temporary integrated data file (#53).

If there are any unprocessed identification codes remaining after integration processing of the set processing identification code is ended (#54: Yes), the routine returns to #45 and one unprocessed identification code is set as the processing identification code. The integration processing described above is then performed for the set processing identification code, and integrated update data is generated and added to the temporary integrated data file. This recursive integration processing is repeatedly executed for the set processing section until there are no unprocessed identification codes left. Integrated update data for all identification codes that must be supplied for the set processing section is stored in the temporary integrated data file. Processing is subsequently performed that stores, in an integrated data file for the set processing section, the temporary integrated data file that completely stores the update data for all identification codes that must be supplied (#55). At such time, if the processed update data file was extracted by the request update data extraction unit 10, the temporary integrated data file is stored in the request update integrated data file 33. However, if the processed update data file was extracted by the safeguard update data extraction unit 11, the temporary integrated data file is stored in the safeguard update integrated data file 34. Thereafter, the temporary integrated data file is reset in order to store data for the next set processing section (#56).

If there are any unprocessed update sections remaining after integration processing of the set processing section is ended (#57: Yes), the routine returns to #41 and one unprocessed update section is set as the processing section. The integration processing described above is then performed for the set processing section, and after integration the temporary integrated data file is generated and stored in the integrated data file for the set processing section. This recursive integration processing is repeatedly executed for all the update sections until there are no unprocessed update sections left, and the request update integrated data file 33 or the safeguard update integrated data file 34 is generated for all the update sections that must be supplied.

3-5. Processing Performed by Database Update Unit 7

Figure 20:
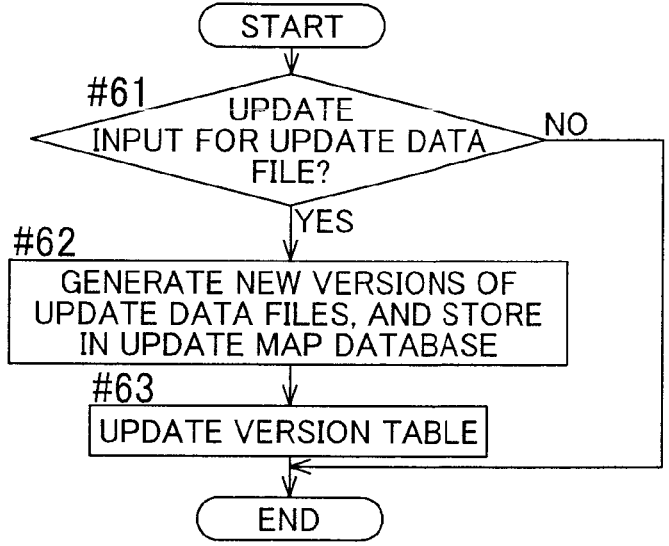
FIG. 20 is a flowchart that shows processing performed by a database update unit.

FIG. 20 is a flowchart that shows processing performed by the database update unit 7 to update the update data file Ma and the version table VT stored in the update database DB1.

As shown in FIG. 20, the database update unit 7 determines whether there is update input through the input device 4 that adds, modifies, or deletes map information in order to upgrade the version of the update data file Ma (#61). If there is update input for the update data file Ma (#61: Yes), based on the content of the update input, the map update data supply device 1 uses the database update unit 7 to generate a new version of the update data file Ma for difference updating per section p. The update data file is additionally stored in the update map database DB1 (#62).

Using the generated new version of the update data file Ma, the database update unit 7 performs processing to update the latest version of the generated section p stored in the version table VT (#63).

3-6. Processing Performed by Version Table Update Unit 8

Figure 21:
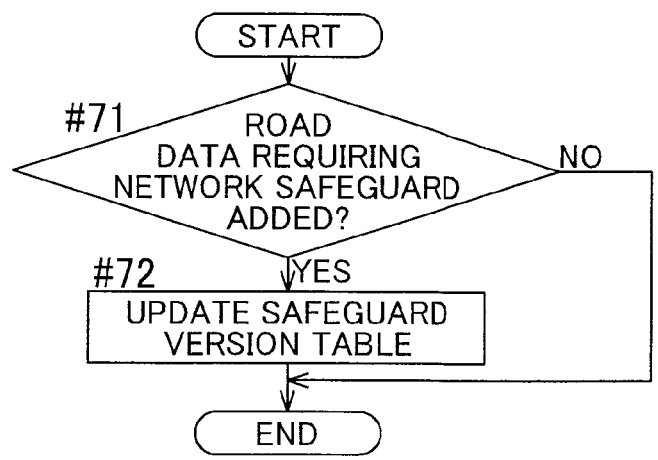
FIG. 21 is a flowchart that shows processing performed by a version table update unit.

FIG. 21 is a flowchart that shows processing performed by the version table update unit 8 to update the safeguard version table SVT.

As shown in FIG. 21, if the database update unit 7 generates new versions of the update data file Ma requiring a network safeguard for two adjacent sections p as described above (#71: Yes), the version table update unit 8 performs processing to associate the new versions, as the safeguard versions va of the adjacent sections p, with the section group g formed of the two adjacent sections p, and cumulatively record these in the safeguard version table SVT (#72).

3-7. Processing Performed by Management Database Update Unit 9

Figure 22:
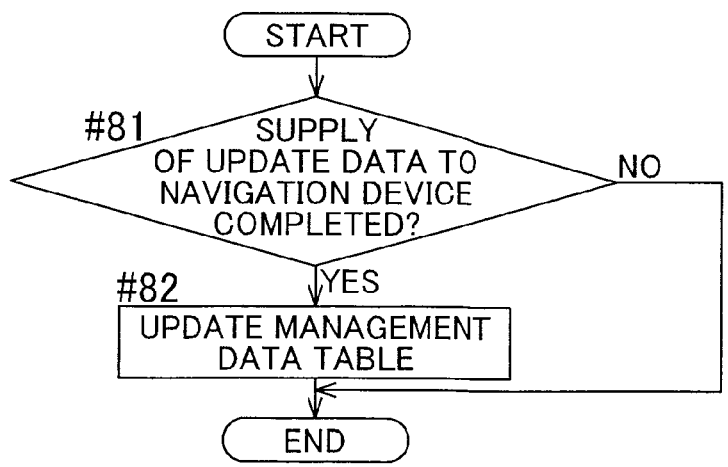
FIG. 22 is a flowchart that shows processing performed by a management database update unit.

FIG. 22 is a flowchart that shows processing performed by the management database update unit 9 to update a plurality of management data tables DT that is stored in the management database DB2 and corresponds to each navigation device 2.

As shown in FIG. 22, if supply of the information of the update data file Ma to the navigation device 2 is completed as described above (#81: Yes), the management database update unit 9 performs processing to update the current version that is the latest update version of the section p in the management data table DT provided per navigation device 2, using the update version of the section p in the supplied update data file Ma (#82).

4. Operation Processing for Map Updating in Navigation Device 2

Next, the processing of the navigation device 2 that is operated in accordance with the map data update program will be described based on a flowchart. Here, when updating the map data Mb stored in the map database DB3, the navigation device 2 uses the update request generation unit 48 to generate the update request fb and transmit the update request fb to the map update data supply device 1. The navigation device 2 subsequently acquires the integrated data file fa, which is generated by the map update data supply device 1 after receiving the update request fb. Based on the integrated data file fa, the navigation device 2 updates the map data Mb.

Figure 23:
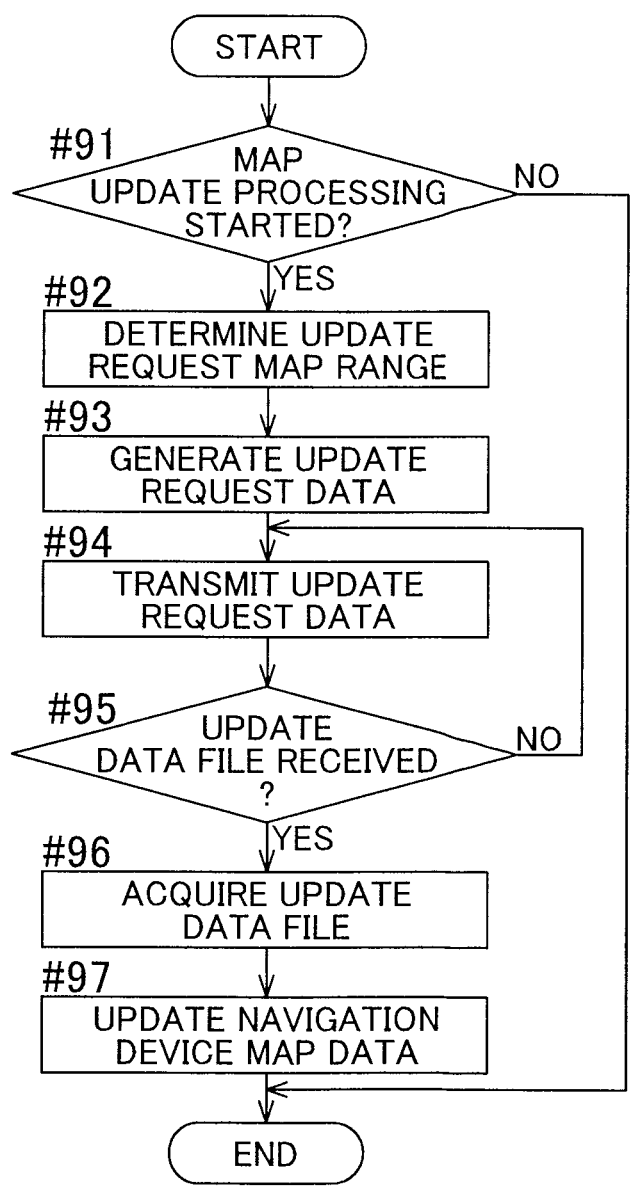
FIG. 23 is a flowchart that shows operation processing for map updating in the navigation device.

As shown in FIG. 23, the navigation device 2 determines whether the map update processing has started (#91). The map update processing is started, for example, if the navigation device 2 regularly performs the map update processing at a preset timing, if the map data Mb is referenced by the navigation computation unit 27 in a manner that satisfies a prescribed condition, or if there is a request operation to start the map update processing from the user of the navigation device 2.

If the map update processing is started (#91: Yes), the navigation device 2 uses the update request generation unit 48 to perform processing that determines the update request map range 51 to be transmitted to the map update data supply device 1 as described above (#92), and generates the update request fb that is constituted from the update request map range 51 and the identification information (#93). Next, the navigation device 2 uses the communication control unit 50 to control the communication device 46 so as to transmit the update request fb generated at #93 to the map update data supply device 1 (#94). In the map update data supply device 1, after receiving the update request fb, processing is performed to generate the request update integrated data file 33 and the safeguard update integrated data file 34 as described above, and supply these data files to the navigation device 2. If the navigation device 2 does not receive the integrated data file fa from the map update data supply device 1 before the elapse of a prescribed time (#95: No), the navigation device 2 determines a communication abnormality and transmits the update request fb again (#94).

If the navigation device 2 receives the integrated data file fa from the map update data supply device 1 (#95: Yes), the integrated data file fa are acquired (#96). The navigation device 2 then uses the map data update unit 49 to perform a difference update of the map data Mb based on the integrated data file fa (#97). As described above, in some embodiments, the integrated data files fa are files that include update data for difference updating the update section, wherein the update section is constituted from the request update section 23 that is set based on the update request map range 51, and the safeguard update section 24 that is used for network safeguarding. Therefore, the map data update unit 49 updates the map data Mb at #97 by difference updating the map data of the section p corresponding to the update section in the layer 1 of the main map data Mb1 of the map data Mb, based on the update data for difference updating included in the integrated data file fa. After performing the above, the operation processing for map updating in the navigation device 2 is ended.

Embodiments of the map update data supply device and map update data supply program, disclosed above, may be used to supply data for updating map data to a navigation device having map data.

What is claimed is:

1. A map update data supply device that is connectable to a navigation device that includes a map database via a communication network, the map update supply device being configured to supply data for updating the map database to the navigation device, the map database including at least road network information and being divided into a plurality of sections, the map update data supply device comprising:
a storage device including an update map database configured to
manage versions of an update data file for updating a difference in the map database for each of the sections, and
store the update data file of each of the versions for each of the sections; and
a control device including
a request update data extraction unit configured to, based on an update request from the navigation device,
extract a request update section that is a section for updating the difference, and
extract, for each request update section, the update data file of up to a latest version,
a safeguard update data extraction unit configured to, if all request update sections are updated up to the latest version,
extract a safeguard update section that is a section needed to be updated to ensure a road network connection between adjacent sections, and
extract, for each safeguard update section, the update data file of up to an update safeguard version that is a version needed to be updated to ensure the road network connection,
an integrated data generation unit configured to
generate a request update integrated data file for a single time of difference update by integrating, for each request update section, all versions up to the latest version of the update data file for each request update section extracted by the request update data extraction unit, and
generate a safeguard update integrated data file for a single time of difference update by integrating, for each safeguard update section, the update data file up to the update safeguard version for each safeguard update section extracted by the safeguard update data extraction unit, and
an integrated data supply unit configured to supply, to the navigation device, the request update integrated data file and the safeguard update integrated data file generated by the integrated data extraction unit.

2. The map update data supply device according to claim 1, wherein
a set of a plurality of data units respectively associated with identification codes constitutes the map database of each of the sections,
the update data file includes update data that includes any one of an addition, a modification, and a deletion for each of the data units, and
the integrated data generation unit is configured to, for all versions of the update data file extracted for each of the sections,
integrate a plurality of versions of update data in which a first data unit that had not existed before an update has been added and finally deleted, in such a manner that an update of the first data unit is not performed,
integrate a plurality of versions of update data in which a content of a second data unit that had existed before an update has been modified and finally deleted, as one piece of data for performing an update to delete the second data unit, and
integrate a plurality of versions of update data in which a third data unit that had not existed before an update has been added and modified, as one piece of data for performing an update to add the third data unit.

3. The map update data supply device according to claim 1, further comprising:
a management database configured to manage a current version of each of the sections in the map database for each of a plurality of navigation devices, wherein
the request update data extraction unit is configured to extract, for each request update section, all versions of the update data file that are newer than the current version managed by the management database and up to the latest version stored in the update map database, and
the safeguard update data extraction unit is configured to extract, for each safeguard update section, all versions of the update data file that are newer than the current version and up to the update safeguard version.

4. The map update data supply device according to claim 1, wherein
a set of a plurality of data units respectively associated with identification codes constitutes the map database of each of the sections, and
the update data file has, for each data unit, an update flag for each data item included in the data unit.

5. The map update data supply device according to claim 4, wherein the update data file has post-update data for only a data item for which the update flag indicates there is an update.

6. The map update data supply device according to claim 1, wherein
a set of a plurality of data units respectively associated with identification codes constitutes the map database of each of the sections, each of the data units including road data corresponding to a road that connects intersection points,
update data configured to add the road data includes attribute data including a start point intersection and an end point intersection in association with a new identification code corresponding to the road data, and
update data configured to modify the road data includes post-update attribute data not including the start point intersection and the end point intersection in association with a new identification code corresponding to the road data.

7. The map update data supply device according to claim 1, further comprising:
a safeguard version table configured to store, as a safeguard version, in association with a section group that is a combination of a section and a section adjacent thereto in the update map database, a version of the update data file of each of the sections when safeguarding of a road network connection between the sections that constitute the section group is required, wherein
the safeguard update data extraction unit is configured to
extract the safeguard update section based on the safeguard version table, the request update section, and a latest version of the request update section,
extract the update safeguard version for each safeguard update section, and
extract the update data file up to the update safeguard version.

8. A map update data supply method of a map update data supply device supplying data for updating a map database to a navigation device, the map database including at least road network information and being divided into a plurality of sections, the map update data supply method being executed by a control device included in the map update data supply device, the method comprising:
executing, utilizing a computational processing device, a map update data supply method, the map update data supply method including:
managing an update map database that manages, for each of the sections, versions of an update data file for updating a difference in the map database, and storing the update data file of each of the versions for each of the sections;
extracting, based on an update request from the navigation device, a request update section that is a section for updating the difference, and extracting the update data file of up to a latest version to be supplied to the navigation device for each request update section;
extracting, when all request update sections are updated up to the latest version, a safeguard update section that is a section needed to be updated to ensure a road network connection between adjacent sections, and extracting for each safeguard update section, the update data file of up to an update safeguard version that is a version needed to be updated to ensure the road network connection;
integrating, for each request update section, all versions up to the latest version of the update data files for each request update section, and generating a request update integrated data file for a single time of difference update;
integrating, for each safeguard update section, the update data file up to the update safeguard version for each safeguard update section, and generating a safeguard update integrated data for a single time of difference update; and
supplying, to the navigation device, the request update integrated data file and the safeguard update integrated data file.

9. A non-transitory computer readable media including program instructions, which when executed by a processor cause the processor to perform:
managing an update map database that manages, for respective section versions of an update data file for updating a difference in a map database, and storing the update data file of the versions for the respective sections;
extracting, based on an update request from a navigation device, a request update section that is a section for updating the difference, and extracting the update data file of up to a latest version to be supplied to the navigation device for each request update section;
extracting, when all request update sections are updated up to the latest version, a safeguard update section that is a section needed to be updated to ensure a road network connection between adjacent sections, and extracting for each safeguard update section, the update data file of up to an update safeguard version that is a version needed to be updated to ensure the road network connection;
integrating, for each request update section, all versions up to the latest version of the update data files for each request update section, and generating a request update integrated data file for a single time of difference update;
integrating, for each safeguard update section, the update data file up to the update safeguard version for each safeguard update section, and generating a safeguard update integrated data for a single time of difference update; and
supplying, to the navigation device, the request update integrated data file and the safeguard update integrated data file.

10. The map update data supply device according to claim 1, wherein the control device includes a central processing unit and a storage medium.

11. The map update data supply method according to claim 8, wherein the control device includes a central processing unit and a storage medium.

12. The map update data supply method according to claim 8, wherein the control device includes a central processing unit and a storage medium, and wherein at least one of the actions of the map update data supply method is executed using at least one of the central processing unit or storage medium.

* * * * *